US005787402A

United States Patent [19]
Potter et al.

[11] Patent Number: 5,787,402
[45] Date of Patent: Jul. 28, 1998

[54] METHOD AND SYSTEM FOR PERFORMING AUTOMATED FINANCIAL TRANSACTIONS INVOLVING FOREIGN CURRENCIES

[75] Inventors: Neil D. Potter, Westfield; Bohdan Chomut, Summit; David M. Jacobs, Wayne; Peter E. Rayner, Westfield, all of N.J.; Cynthia M. Anasson, Milford, Conn.; Elizabeth J. Friedman, Falmouth, Great Britain

[73] Assignee: Crossmar, Inc., New York, N.Y.

[21] Appl. No.: 727,786

[22] Filed: Oct. 8, 1996

Related U.S. Application Data

[60] Provisional application No. 60/017,717 May 15, 1996.
[51] Int. Cl.$^6$ .................................................. G06F 17/60
[52] U.S. Cl. ........................................ 705/37; 705/39
[58] Field of Search ................................ 395/235, 236, 395/237, 238, 239; 705/35, 36, 37, 38, 39

[56] References Cited

U.S. PATENT DOCUMENTS

| 4,766,293 | 8/1988 | Boston | 705/41 |
|---|---|---|---|
| 5,136,501 | 8/1992 | Silverman et al. | 395/237 |
| 5,195,031 | 3/1993 | Ordish | 395/237 |
| 5,262,942 | 11/1993 | Earle | 705/37 |
| 5,305,200 | 4/1994 | Hartheimer et al. | 395/237 |
| 5,508,913 | 4/1996 | Yamamoto et al. | 705/37 |

OTHER PUBLICATIONS

Foreign Exchange Trading Made Easy, Treasury Manager's Report, Sept. 16, 1994.
Talmor, Sharona, Product File, The Banker, pp. 70–71, Mar. 1995.
Quotron's F/X Trader Gets European Push CITI Lends Support, System Battle Heats Up, FX Week, Jan. 18, 1991.
FXLink Specification, 8 Dec. 1994.

*Primary Examiner*—Edward R. Cosimano
*Assistant Examiner*—Barton L. Bainbridge
*Attorney, Agent, or Firm*—Kilpatrick Stockton LLP; George T. Marcou

[57] ABSTRACT

A method and system for performing financial transaction involving foreign currencies deals in virtually all trading currencies, automatically incorporates the current market process and operates in a secure environment. Customers can access the system on-line and in real time through various terminals such as, for example, a personal computer (PC). By inputting information in response to prompts on the screen, the system quickly identifies the nature of the transaction the customer desires and the customer inputs the characteristics of the transaction the user desires. The system then automatically generates an offer in response to the customer's request based upon a number of parameters including the market price, the size and nature of the transaction and the size and nature of the client. The system then promptly displays the bank's offer to the customer in a clear and concise manner. The customer is then given an opportunity to accept the offer, ask that the offer be updated or reject the offer. If the customer delays for too long a period of time in deciding to accept or reject the offer, the system automatically withdraws and updates the offer thereby protecting the bank from liability for a "stale" rate. If accepted, the trade is automatically forwarded for processing and assigned a reference number for tracking and control purposes.

123 Claims, 29 Drawing Sheets

FIG. 15

Enter SPOT FX Transaction

Entity [Demo Customer Entity 1 ▼]   Nostro [Nostro 1 ▼]

Details

Buy Ccy [GBP UK Pound ▼]
Buy Amount [500000]

Sell Ccy [USD US Dollar ▼]
Sell Amount [766500.00]

Transaction Status
Reference No.: 953130001
Status: Entered
Trans Time: 12:03:22 PM
Trans Date: 5/10/96
User Id: CATSCUST

For Value On
Tenor ⊙ [SP ▼]
Date ○ [13.05.96]

Rate
GBP/USD   15930
USD/GBP   06523

[Refresh] [Trade]   [Clear] [Close] [Help]

Enter SWAP FX Transaction

Entity: Demo Customer Entity 1

Nostro: Nostro 1

First Leg of Swap

| Buy Ccy | Buy Amount |
|---|---|
| GBP UK Pound | 550000 |
| Sell Ccy | Sell Amount |
| USD US Dollar | 843150.00 |

For Value On

Tenor ⊙ SP    Date ○ 13.05.96

Transaction Status

Reference No.:
Status: Released
Trans Time: 12:22:52 PM
Trans Date: 5/10/96
User Id: CATSCUST

Rate

GBP/USD 15930
USD/GBP 06523

Forward Legs of Swap

| Tenor | Val. Date | Ccy 1 Amt | Ccy 2 Amt | Swap Points | Rate |
|---|---|---|---|---|---|
| | | | | | |
| | | | | | |
| | | | | | |
| | | | | | |

[Refresh] [Trade] [Clear] [Close] [Help]

FIG. 18

View Transaction — FOREIGN EXCHANGE

From: [ ]  To: [ ]  [All]

Warrants — Trade ID ⊙  Cust No. ○  Instrument [ ]

| Date | Buy Ccy | Buy Amt | Sell Ccy | Sell Amt | Txn Rate | T | Value Date | Ref No | Status |
|---|---|---|---|---|---|---|---|---|---|
| 03.01.96 | GBP | 123000.00 | DEM | 272592.60 | 2.2162% | SP | 05.01.96 | 960035001 | Release |
| 03.01.96 | USD | 20000.00 | FRE | 98718.00 | 4.9359% | IM | 06.02.96 | 960035002 | Release |
| 03.01.96 | CHF | 93845.00 | USD | 81399.08 | 1.1529% | BD | 18.01.96 | 960035003 | Release |

[Collect] [Detail] [Clear] [Close] [Help]

Transaction Count: 3

FIG. 22

Money Market Trader

File  View  Trade  Setup  Admin  Window  Help

Rate Calculator

Trade Date: 5/10/96
Currency: DEM
Spot Rate: 1.44
Tenor: 1WK
No. of Days: 7
Value Date: 5/12/96
Maturity Date: 5/19/96
Bid Rate:
Offer Rate:

[Calculate]  [Close]

Deutche Mark

| Tenor | USD Interest Rate Bid | USD Interest Rate Offer | Days | Forward Points Bid | Forward Points Offer | MM Rates Bid | MM Rates Offer |
|---|---|---|---|---|---|---|---|
| O/N | 5.61% | 5.66% | 1 | 2.50 | 2.25 | (0.643%) | 0.035% |
| T/N | 5.61% | 5.66% | 1 | 2.50 | 2.25 | (0.643%) | 0.035% |
| S/N | 5.64% | 5.70% | 1 | 2.50 | 2.25 | (0.613%) | 0.074% |
| 1WK | 5.63% | 5.70% | 7 | 5.90 | 5.40 | 3.520% | 3.769% |
| 2WK | 5.63% | 5.70% | 14 | 11.40 | 11.00 | 3.589% | 3.731% |
| 3WK | 5.63% | 5.71% | 21 | 18.20 | 17.90 | 3.456% | 3.571% |
| 1MO | 5.62% | 5.71% | 31 | 26.50 | 25.50 | 3.472% | 3.643% |
| 2MO | 5.52% | 5.58% | 62 | 51.00 | 49.00 | 3.444% | 3.585% |
| 3MO | 5.48% | 5.58% | 92 | 72.00 | 70.00 | 3.496% | 3.650% |
| 4MO | 5.46% | 5.56% | 122 | 89.00 | 86.00 | 3.602% | 3.764% |
| 5MO | 5.45% | 5.55% | 153 | 105.00 | 102.00 | 3.694% | 3.844% |
| 6MO | 5.44% | 5.54% | 184 | 122.00 | 118.00 | 3.736% | 3.891% |
| 7MO | 5.42% | 5.52% | 216 | 135.84 | 131.44 | 3.796% | 3.948% |
| 8MO | 5.40% | 5.50% | 245 | 148.58 | 143.84 | 3.828% | 3.977% |
| 9MO | 5.38% | 5.48% | 275 | 159.00 | 154.00 | 3.875% | 4.021% |
| 10MO | 5.37% | 5.47% | 307 | 171.59 | 162.87 | 3.908% | 4.081% |
| 11MO | 5.37% | 5.47% | 337 | 212.00 | 205.00 | 3.718% | 3.871% |
| 12MO | 5.37% | 5.47% | 366 | 189.00 | 182.00 | 4.008% | 4.157% |

| Trade Date | Principal | USD Equivalent | Days | Interest Rate |
|---|---|---|---|---|
| 5/10/96 | CHF 2320000.00 | 2000000.00 | 30 | 5.61% |
| 5/10/96 | MYR 6250000.00 | 2500000.00 | 90 | 5.61% |
| 5/10/96 | NLG 89600.00 | 56000.00 | 30 | 5.61% |

FIG. 24

New Order Entry

On Whose Behalf: Customer 1

Trade: SAM

Counterparty: Citibank

Type:
- ● Buy
- ○ Sell

Buy Currency: DEM
Sell Currency: USD

Buy Amount: 55000

Reference Number: ____

Tenor: SPOT

Type:
- ○ Sell

Value Date: 5/13/96

Target Spot Rate: 1.4898

Rule: STRAIGHT

Expire:
- ● Good Until Cancel
- ○ Good For Day
- ○ Good Until ____

[Clear] [Customer View] [Accept] [Close]

FIG. 25

New Order Entry

Instructions: Call C.R. Waskiewicz 16 Aug w/ market status.

| | | |
|---|---|---|
| Entity: Customer 1 | Tenor: SPOT | Client Reference Number: 14232550 |
| FWD Points: | Default FWD: | Counterparty: Citibank |
| Target Spot: 1.4898 | Currency: DEM | Value Date: 5/13/96 |
| Execution Rate: 1.4898 | Contract Rate: 1.4902 | Outright FWD: |
| | | Difference: .0004 |

[Clear] [Order Details] [Accept] [Close]

FIG. 26

PAYMENT ORDER (MT100) SYSTEM

File  Edit  Views  Windows  Admin  Help

MT100 List

| DATE | SENDER | RECEIVER | STATUS | BUY | SELL | TRANS AMT | MT100 TXN NUM |
|---|---|---|---|---|---|---|---|
| 5/10/96 | UNEESSHH | CIYYUS33 | Open | FIM | USD | 5622345 | L4WERWE69834 |
| 5/10/96 | HYBLFFJT | POTTER33 | Open | JPY | USD | 1330000 | 6WER06558652 |
| 5/10/96 | TYRUCERS | CIYYUS84 | Open | JPY | USD | 24567370 | TT/WERWE4436 |
| 5/10/96 | MKBAARES | CITIUS33 | Open | AUD | USD | 18744684 | 328327386813 |

1 of 4

SWIFT   FX   Filter   Sort

METHOD AND SYSTEM FOR PERFORMING AUTOMATED FINANCIAL TRANSACTIONS INVOLVING FOREIGN CURRENCIES

This is a continuation of provisional application Ser. No. 60/017,717 filed May 15, 1996 now abandoned.

FIELD OF THE INVENTION

The present invention relates generally to methods and systems for performing automated financial transactions, and more particularly to a method and system for performing automated financial transactions involving at least two currencies at real-time market rates between a customer and a financial institution.

BACKGROUND OF THE INVENTION

When a company goes to sell its goods overseas, it often faces the challenge of pricing its goods in a foreign currency. For example, when a domestic manufacturer proposes to sell farming equipment overseas, the foreign purchaser may require the selling price to be in the foreign currency. In order to generate its proposed selling price the domestic manufacturer must have a mechanism to convert the foreign currency to the domestic currency. This conversion enables the manufacturer to determine how much foreign currency the manufacturer will need to pay its workers, purchase materials and other sources which must be paid in the domestic currency.

Further, the manufacturer may not be receiving the foreign currency immediately but rather may be receiving periodic payments over time as set milestones are reached. For example, some foreign currency may be received when the order is placed, some may be received when the goods are delivered and the remainder may be received when the goods are inspected and accepted. Thus, the manufacturer may require a mechanism to convert the foreign currency to domestic currency in the future at set dates (for example, 30 days, 90 days, or 1 year in advance) in order to generate a competitive bid price.

In another example, a company or individual may have possession of an amount of foreign currency for a relatively short period of time and no present need for the currency itself. For example, a domestic company may have sold equipment overseas and been paid in a foreign currency but may not need the foreign currency until three weeks later to pay off a separate debt. The company may wish to collect interest on that money for the three weeks and be paid that interest in the foreign currency.

Financial institutions, such as banks, have historically provided financial services to manufacturers and others who trade in foreign currencies. This function is generally referred to as foreign exchange ("FX") and involves the buying and selling of currencies, often at set times in the future.

Sophisticated markets have developed at various cities throughout the world to trade in currencies. Today such trading goes on 24 hours a day and has created a dynamic and fast paced market wherein currencies can and do often "move" against each other on literally a second-to-second basis. For example, the value of the U.S. Dollar against the Japanese Yen is a relationship which changes over time based upon various economic and political factors including the relative demand for each currency. Due to the vast amount of international trade occurring today, the demand for foreign exchange transactions is enormous.

In setting the exchange rate, for a particular transaction, a bank faces a multitude of factors. One obvious factor is the current rate of exchange between banks for the two currencies the customer wishes to exchange. Further, depending on the size or nature of the relationship with a particular customer a bank may wish to quote that customer a more favorable rate. For example, if the customer has a large transaction or is a steady customer, the bank may wish to provide the customer a more favorable rate. Further, if the currency to be purchased is less stable because it is traded less often or the country issuing the currency is viewed as less stable, the bank may wish to protect itself by charging a premium.

In any event, as is clear from the discussion above, the setting of rates of exchange between currencies to customers is a complex function performed by banks. However, it is also an important role banks play in facilitating international trade.

Currently, the process is manually intensive and may comprise several layers of participation. For example, a customer may contact a trader affiliated with the bank by telephone and provide the trader with the details of the desired trade orally. The trader will take down the information and then determine the price to the customer by assessing several factors including, the current "wholesale" rate of exchange between the currencies, the nature of the customer and the size of the transaction. In order to determine the price, the trader may need to communicate with another individual at the "interbank" desk. The "interbank" desk is the desk affiliated with the bank which determines the base exchange rates to which the bank will commit.

The trader will communicate this price over the telephone and the customer will either accept it or reject it. If accepted, the trader will execute the transaction and the execution will be reflected in the customer's account.

There are several shortcomings in the current system. First, it may be time intensive for the customer because the price is being generated manually by a trader in response to the customer's request. The time needed to respond to the request may be substantial, particularly if the request involves less traded currencies or a complex transaction (such as various payments over various set times).

Further, the current system is labor intensive. Because each response to a customer is being generated by a trader, the bank must adequately staff the number of traders and this can be imperfect, leading to inefficiencies. Plus, there can be frustration created on the part of a customer if all the traders are occupied when the customer's call comes in.

There can also be a lack of uniformity. Different traders may quote different prices for the same requested transaction due to the somewhat subjective way the traders formulate the prices.

Because trades are done telephonically the audit trail consists of transcripts of recordings of telephone calls. The creation of such audit trails require human intervention (for example, the transcribing step) and may not readily be accessible (for example, they may be archived). Accordingly, there is a need for an automatic audit trail which is less expensive and easily accessed.

In a similar vein, whatever system is used must require that the customer commit quickly to the bank's offer. The customer must not be permitted to purposefully postpone commitment to an offer until after the market has moved and then, if the movement is to the customer's advantage, accept the offer. The dynamic nature of today's financial markets require that the offers be held open for only a matter of seconds. Further, security against unauthorized access is required.

In addition, whatever system is used must be able to accommodate a type of foreign exchange transaction known as a leave order. In such an order a customer specifies the terms of the transaction the user desires (called, for example, a "target rate") and then "leaves" the order with the financial institution. The financial institution is given the responsibility of monitoring the market terms against the user's target rate and reporting back to the user. In view of the dynamic nature of the market there is a need to enable the user to automatically execute the desired transaction if the desired terms become available in the market.

SUMMARY OF THE INVENTION

It is an object of the present invention to overcome the shortcomings described above with a method and system for initiating and executing foreign exchange transactions. The improved method and system deals in virtually all trading currencies, automatically incorporates the current market process and operates in a secure environment.

Customers can access the system on-line and in real time through various terminals such as, for example, a personal computer (PC). By inputting information in response to prompts on the screen, the system quickly identifies the nature of the transaction the customer desires and the customer inputs the characteristics of the transaction the user desires. The system then automatically generates an offer in response to the customer's request based upon a number of parameters including the market price, the size and nature of the transaction and the size and nature of the client. The system then promptly displays the bank's offer to the customer in a clear and concise manner. The customer is then given an opportunity to accept the offer, ask that the offer be updated or reject the offer. If the customer delays for too long a period of time in deciding to accept or reject the offer, the system automatically withdraws and updates the offer thereby protecting the bank from liability for a "stale" rate.

If accepted, the trade is automatically forwarded for processing and assigned a reference number for tracking and control purposes. Further, the system can generate a comprehensive array of individual transaction and summary reports. The user can enter settlement instructions and receive confirmation of all trade details automatically.

For recurring transactions, the details of the transactions can be stored and recalled to avoid any need to enter them repetitively.

Further, the system enables the user to designate the particular account to be used for settlement purposes.

The system also automatically accepts, monitors and executes leave orders. The user is given the option for auto execution. A blotter of leave orders is automatically generated and may be monitored by the user. Color coding is used to alert the user about the status of the market versus the various leave orders.

The system also accommodates purchase orders wherein a customer purchases a currency for payment to another party.

Further, the system enables users to perform money market transactions in which a user may deposit money in a first currency and automatically obtain interest on that deposit in the first currency. The system also automatically provides the user with an interest rate and the equivalent of the interest amount in a second currency, such as U.S. Dollars.

BRIEF DESCRIPTION OF THE DRAWINGS

FIG. 15 represents an FX Trade spot transaction screen.

Figure 16:
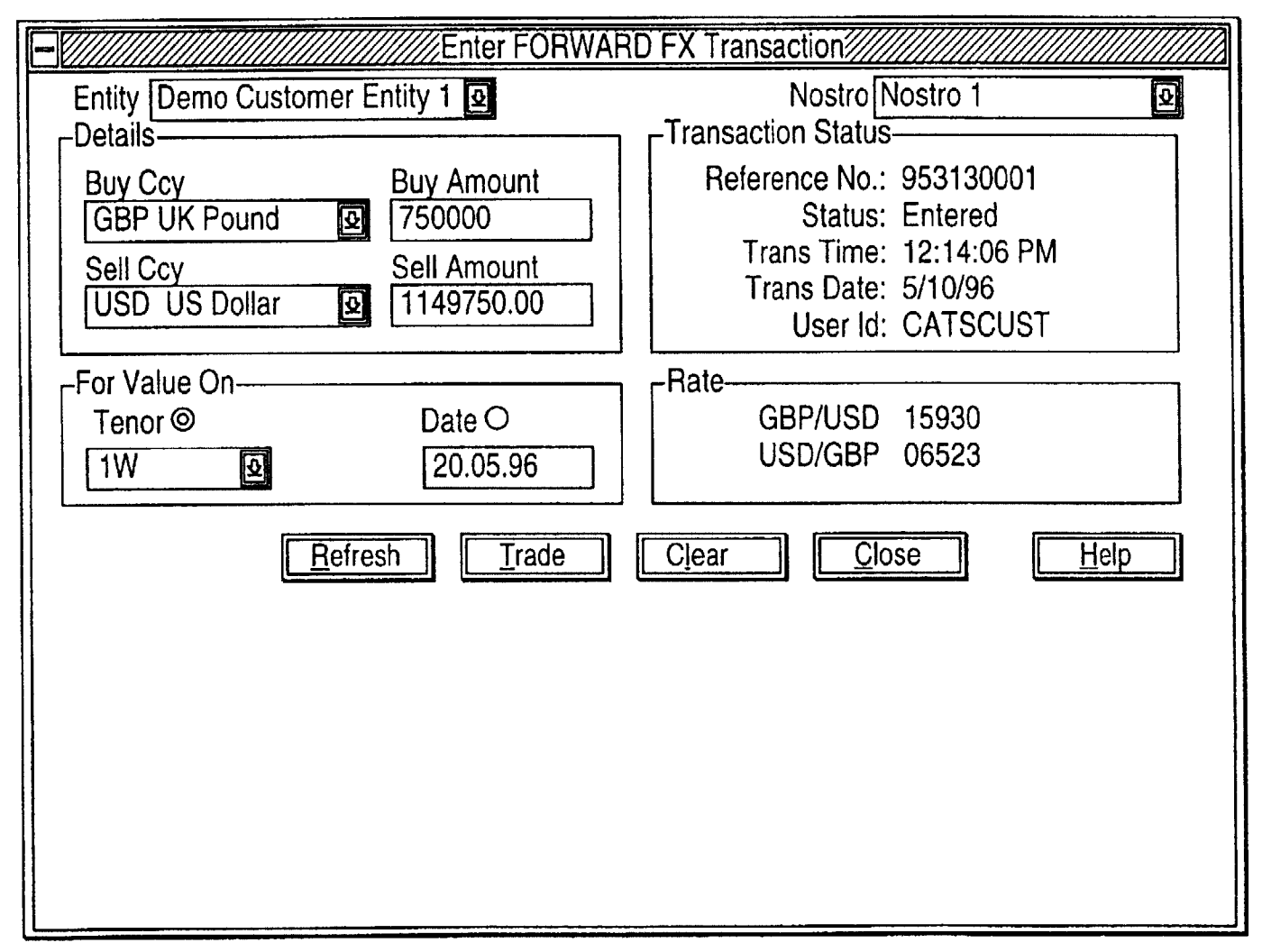

FIG. 16 represents an FX Trade forward transaction screen.

FIG. 17 represents an FX Trade swap transaction screen.

FIG. 18 represents an FX Trade View Transaction screen.

FIG. 22 represents a Money Market rate calculator that shows the calculated foreign currency Money Market rates based on the U.S. dollar (USD) interest rates as well as the underlying FX spot rate and its related forward points.

FIG. 24 represents an FX Order New Order Entry screen.

FIG. 25 represents an FX Order screen that provides an analysis of the difference between a target and execution rate.

FIG. 26 represents a list of outstanding messages to the Payment Order Server.

DETAILED DESCRIPTION

The described electronic Foreign Exchange ("FX") applications allow clients of a financial institution to engage in international monetary trades using a personal computer ("PC") with Microsoft Windows software. The FX applications are FX Trade, Money Market, FX Order and Payment Order.

Figure 1:
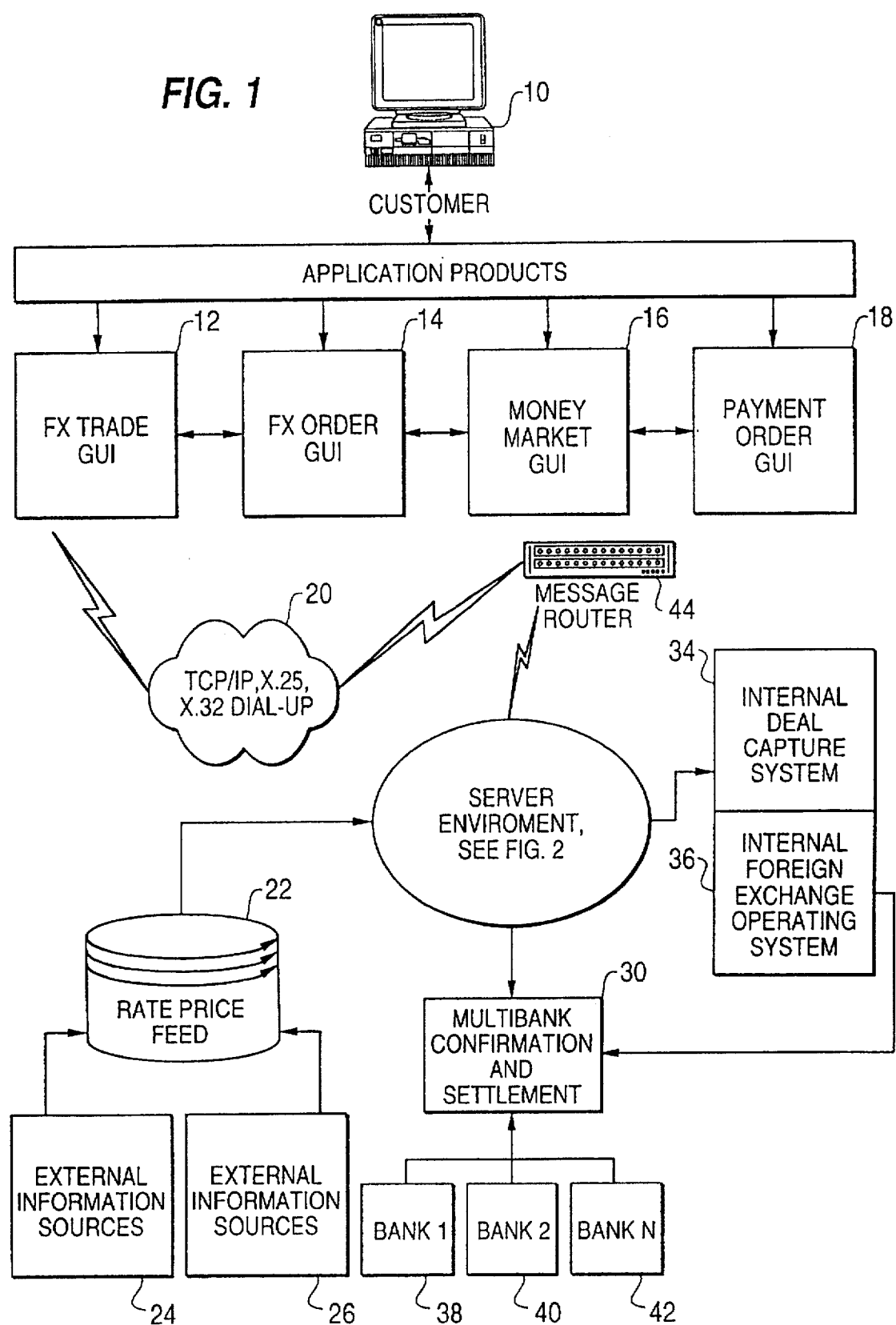
FIG. 1 charts, generally, the overall applications in relation to related components with which they communicate.

The network of servers comprises the following components:

Message Router (see FIG. 1, element 44)

The Message Router provides the means by which the client PC and the FX Trade, Money Market, FX Order and Payment Order applications' servers communicate. The Message Router receives all requests and replies between clients and the applications' servers (refer to FIG. 2).

Figure 2:
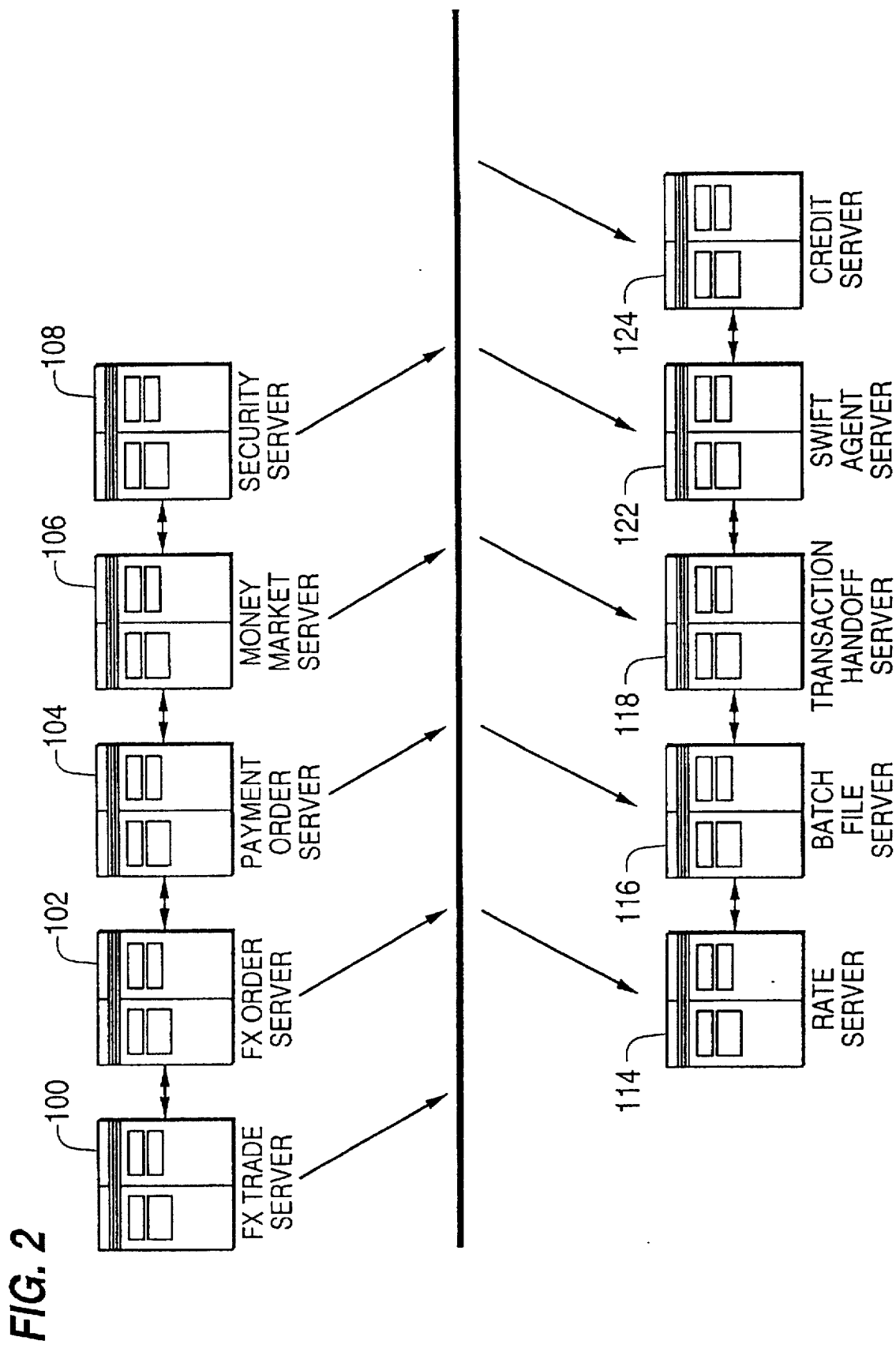
FIG. 2 shows the network of central computers, or "servers," that form the backbone of the FX applications' functions.

Security Server (see FIG. 2, element 108)

The Security Server verifies a client's user name and password upon log-in.

FX Trade Execution and Dealing Server (100)

The FX Trade Execution and Dealing Server (FX Trade Server) performs FX spot, forward and swap trades for authorized clients. It obtains rates for those trades from the Rate Server, performs the underlying FX swap transaction for a deposit made through the Money Market Server and FX spot and forwards leave orders for the FX Order Server. It converts currencies for the Payment Order Server.

Money Market Trade Execution Server (Money Market Server) (106)

This server allows a client to deposit a foreign currency for a short-term deposit at a specified deposit rate. The financial institution uses the FX Trade Server to swap the deposit for USD for the deposit's duration. At the end of that duration, if a client has not opted for a rollover at least two business days before the maturity date of the deposit, USD are swapped back to the original foreign currency, both principal and interest accrued at the specified deposit rate, with principal and interest returned to the client in the original currency.

FX Order Server (102)

This server handles the tracking of leave orders for spot and forward orders, to be executed by FX Trade Server, in an Order Blotter. The FX Order Server provides for varying degrees of automatic and manual leave orders and uses the Rate Server to track and match a leave order's desired rate.

Payment Order Server (104)

This server handles bank-to-bank money orders and allows the creation of an FX transaction out of a foreign payment. The Payment Order Server breaks incoming payment orders down into their individual components before forwarding the FX trade components to the FX Trade Server for execution. The FX Trade Server, in turn, converts the trades' foreign currency amounts into USD. The Payment Order Server receives money orders via either the Society for Worldwide Interbank Financial Telecommunication (SWIFT) Agent Server 122 or the Batch File Transfer Server via direct interactive log-in by a Payment Order Server user 116.

Rate Server (114)

This server supplies foreign exchange rates for the applications' servers. Rates are updated from one or more sources 24 hours-a-day.

Credit Server (124)

This server verifies client credit and allows or denies trades from going forward based on specific user credit limits. It supports the FX Trade and FX Order Servers.

Transaction Hand-off Server (118)

This server receives all trades following execution by the FX Trade Server. It relays trades for internal financial institution Deal Capture (see FIG. 1, element 34).

Graphical User Interface (GUI)

This represents a number of user interfaces for use on the client PC designed to work with the various applications (FX Trade, Money Market, FX Order and Payment Order).

Applications on the FX Trade Server, Money Market Server, FX Order Server and Payment Order Server can be used by subscribing clients. Each client is assigned a unique identification number. One client may have one or more entities assigned to it for use of an application. Individual authorized users within each client can utilize an application. Each user is assigned a unique user name and password and has different accesses and controls assigned. All of this information is contained in a user profile stored in the database of the application server being utilized.

Figure 3:
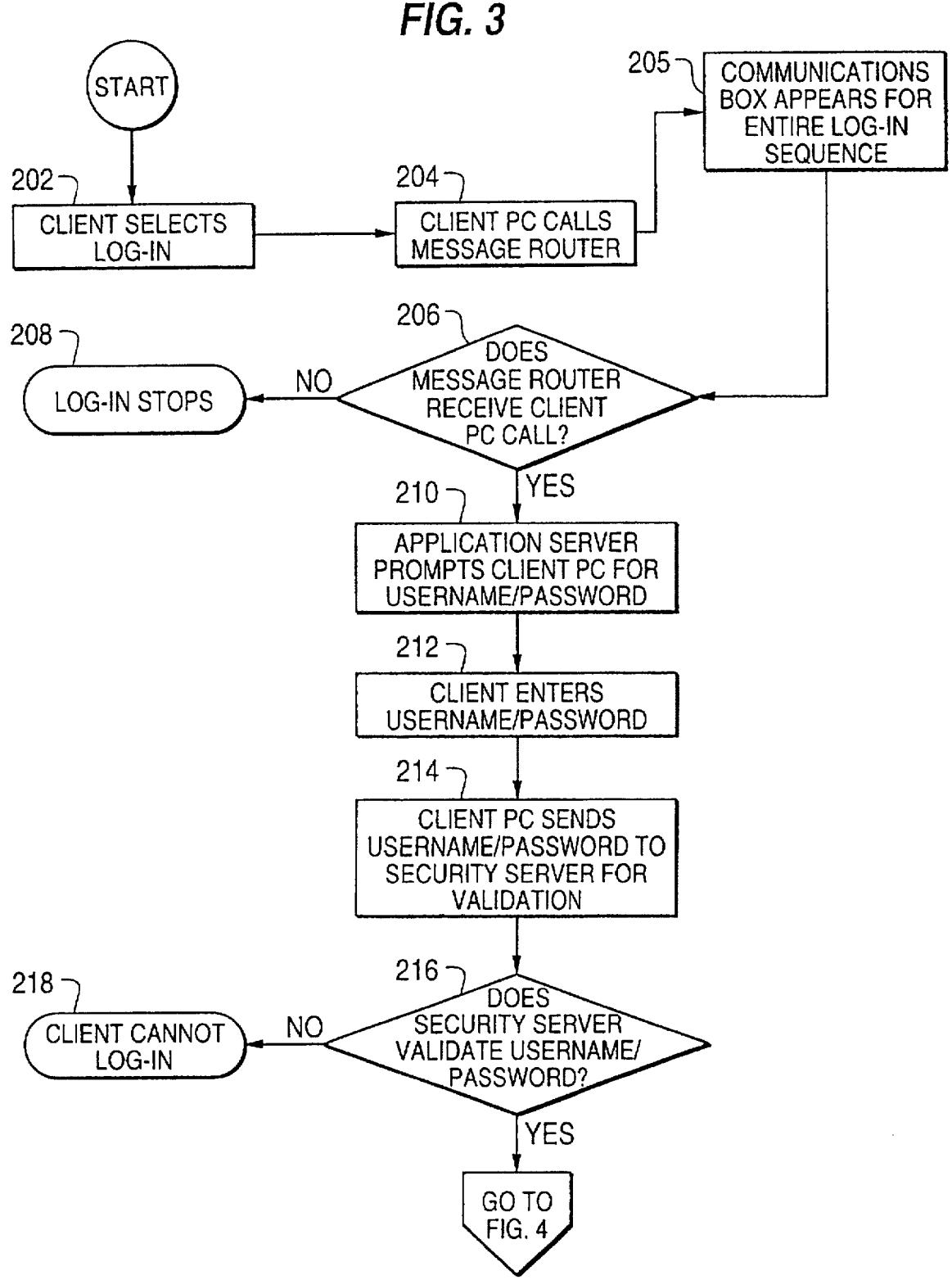
FIGS. 3–4 outline the log-in process for the different applications.

A client initiates use of an application (FX Trade, Money Market, FX Order or Payment Order) by selecting the appropriate program group and icon from the Windows Program Manager screen, and then selecting "log-in" from the File menu FIG. 3, 202. The client PC, using its phone-line connection, dials into the Message Router 204. When the client initiates the log-in process, a dialog box called the "Communications Monitor" appears on the client PC and is visible during the entire log-in sequence 205. If log-in difficulties occur 208, such as the PC phone-line failing to establish a connection with the Message Router, then the client can call Customer Service. The Communications Monitor will show any log-in difficulties. A client may choose to not view the Monitor box at any time during the log-in sequence by selecting "Monitor" from the "Tools" menu to disengage that feature.

Figure 14:
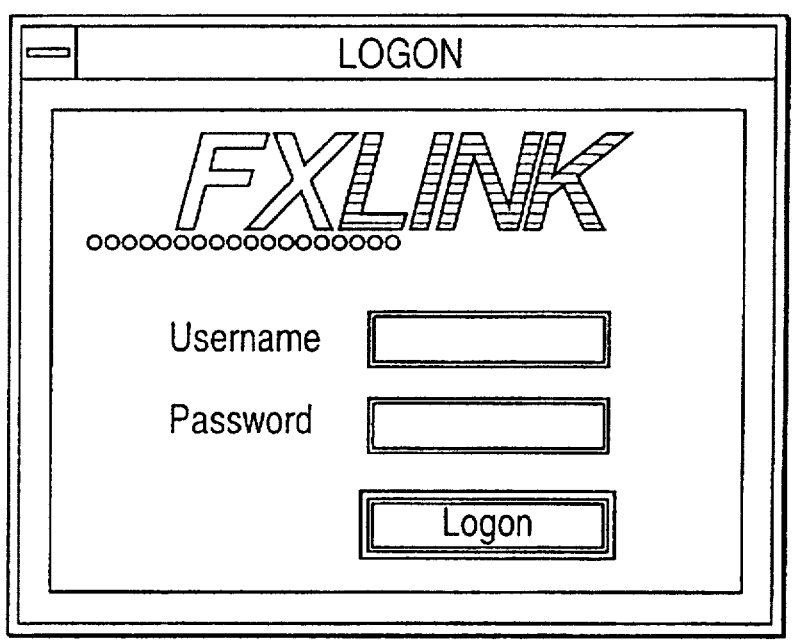
FIG. 14 represents an application log-in screen.

After the client PC phone-line establishes a connection with the Message Router, the Message Router prompts the client PC for username and password entry for the application to be accessed 210 (refer to FIG. 14). During client username and password entry, the client PC displays a message warning unauthorized users. The client PC sends the username and password to the Message Router. The Message Router passes this information on to the Security Server 214. The Security Server, in turn, verifies the username and password 216.

If the Security Server's information indicates that the client is unauthorized, then the log-in process does not go forward and the client cannot log-in 218. If the Security Server validates the client username and password, then it returns an authorization code to the Message Router (see FIG. 4, element 222). The client PC, through the Message Router, connects to the specific server that corresponds to the specific application being accessed (FX Trade, Money Market, FX Order or Payment Order). A copy of the user profile is sent to the customer PC from that specific application server at this time. A client only has access to those application functions that are so designated in the user profile and the client PC, which includes user trade limits, authorized trade times and additional password entry before trade release 222. If a client is logging on to the FX Trade Server, Money market Server, or FX Order Server, all available currencies for trade are sent to the client PC 230. The initial entry screen that now appears to the client depends on the specific application being accessed by the client PC (FX Trade, Money Market, FX Order or payment Order).

All messages sent from the client PC to the applications' servers, as well the reverse, are channeled through the Message Router (see FIG. 1, element 44). The Message Router also directs messages by and between the applications' Servers.

Following successful username/password entry and client PC to FX Trade Server connection, the Communications Monitor dialog box closes. The client PC displays its Bulletin Board in a dialog box that a client can clear. The FX Trade GUI tool bar appears below the main menu bar. Several lines at the bottom of the application window are used to display System Status Messages to the client, including "System Open for Trading," "System Temporarily Suspended for Trading-Please call" and "System Closed for Trading." The client receives an Audio/Visual Alert warning if these messages change while on-line. A telephone display will appear on the client PC as a toolbar icon. It remains off the hook while the client is on-line. the client can log-off by either selecting the phone tool icon or choosing Log-off from the File drop down menu. If the communications line with the client PC begins losing its connection during the session, then the client will see the phone icon placed back on the hook, and will also receive an audio alert.

Clients may use the FX Trade application for one-way or, if authorized in the user profile, two-way spot trades (a "spot Trade" is where the value date, or settlement, occurs two business days after the trade, that is, the trade has a "tenor" of two business days). The FX Trade GUI provides the main trade entry for a spot trade, which appears when spot trade is selected from the "Enter" menu FIG. 5, 300 (refer to FIG. 15). The FX Trade GUI sets the tenor to "spot" 302. The FX Trade Server utilizes the user profile stored in its database to confirm client actions against a client's authorizations and accesses, all of which were sent to the client PC at the time of log-in. From this point until the time of trade, at any time, a client may select "Cancel" to cancel the spot trade and return to the FX Trade GUI initial main entry screen.

A client may select an entity/account from a list of valid entities and accounts for which that client's user profile indicates that they are authorized to trade 304. If a client has been set-up as a single user, then only one entity's name will appear 310. If the user profile in the FX Trade Server indicates the Sales/Trader mode, this list will display entities on behalf of which a user is authorized to trade 308. The FX Trade Server sends the list of entities and accounts to the client PC. The entity/account list may not be revised by clients and is maintained by the financial institution on the FX Trade Server FIG. 4, 224.

Figure 4:
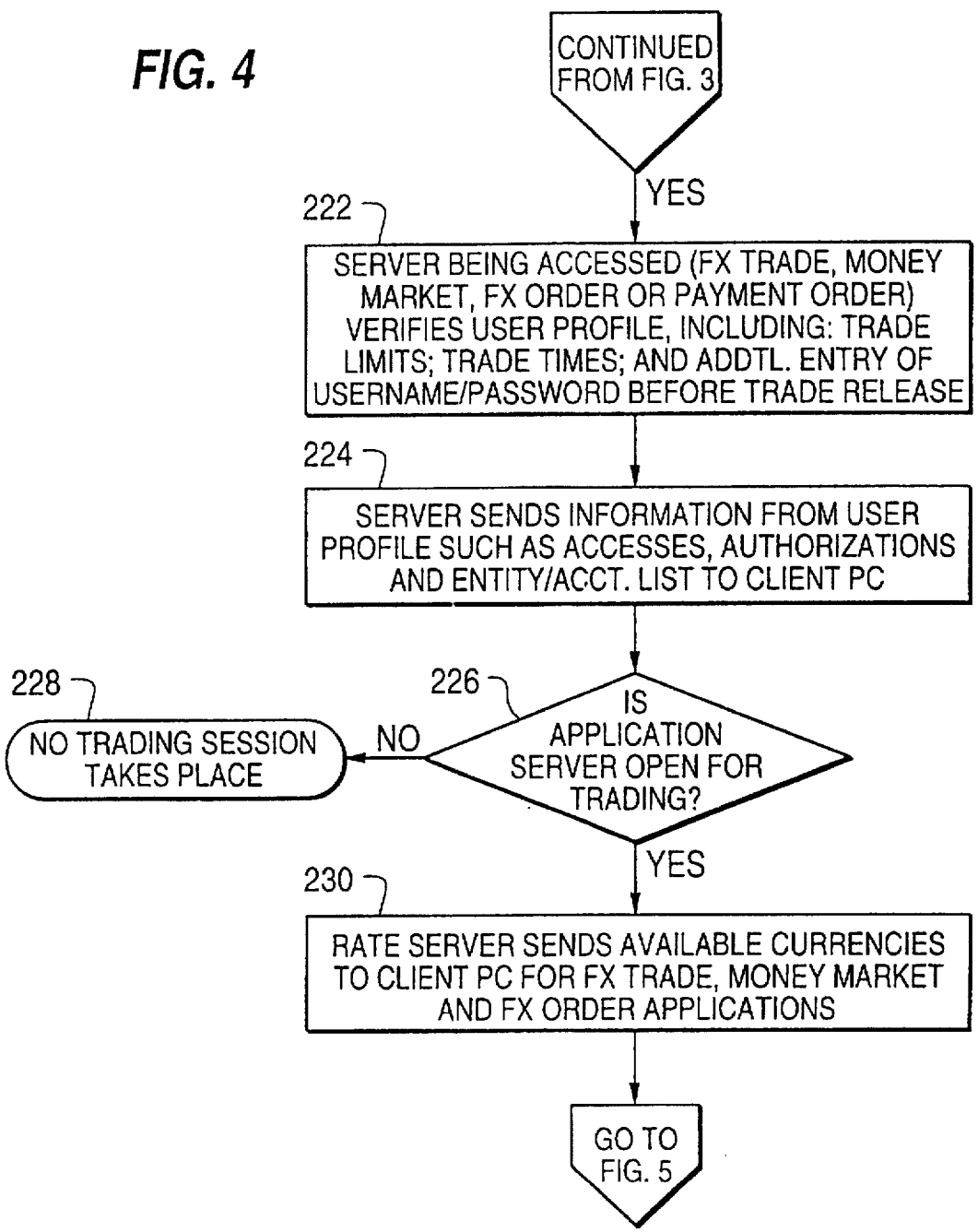
Figure 5:
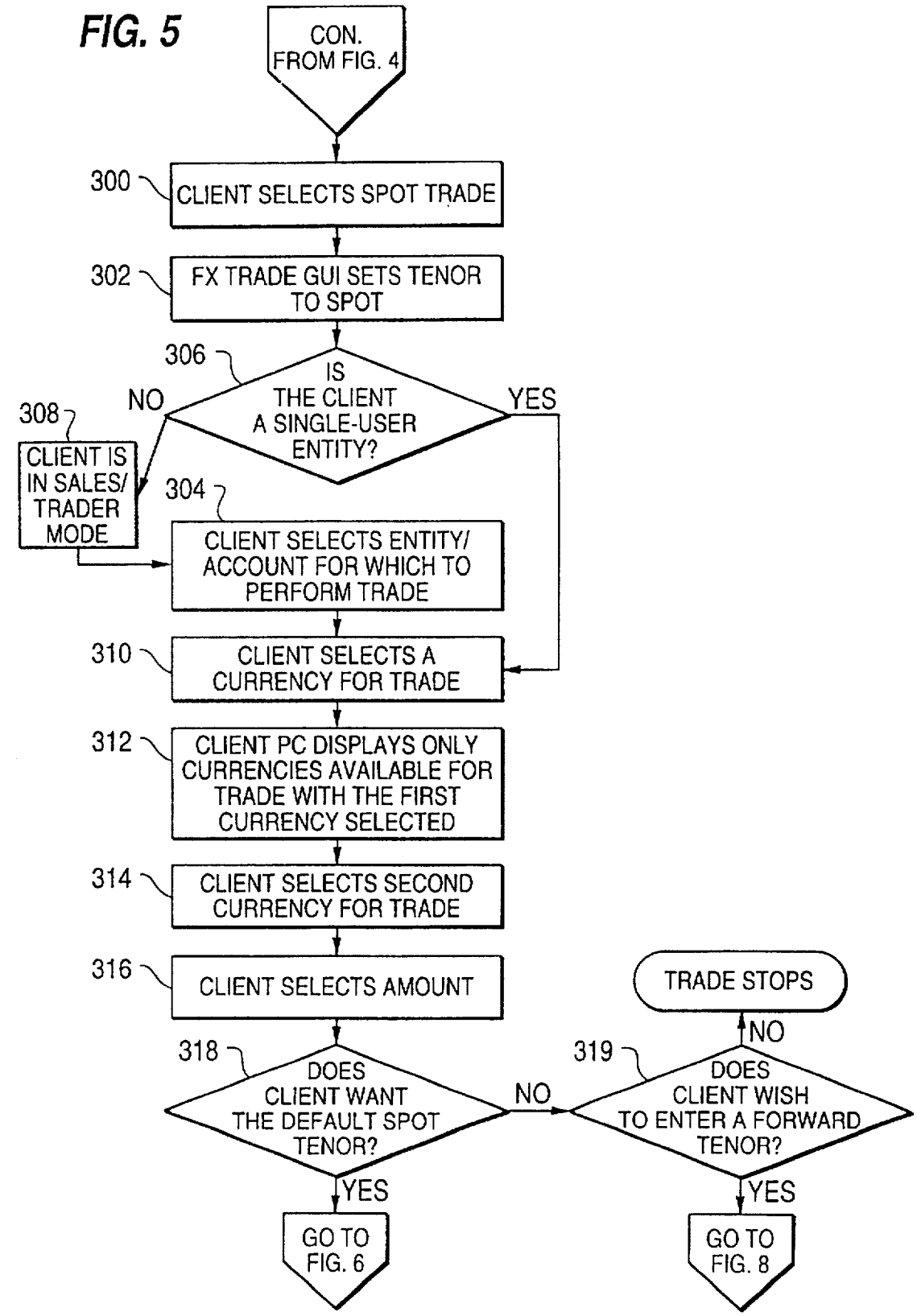
FIGS. 5–8 outline spot and forward trades using FX Trade.
Figure 6:
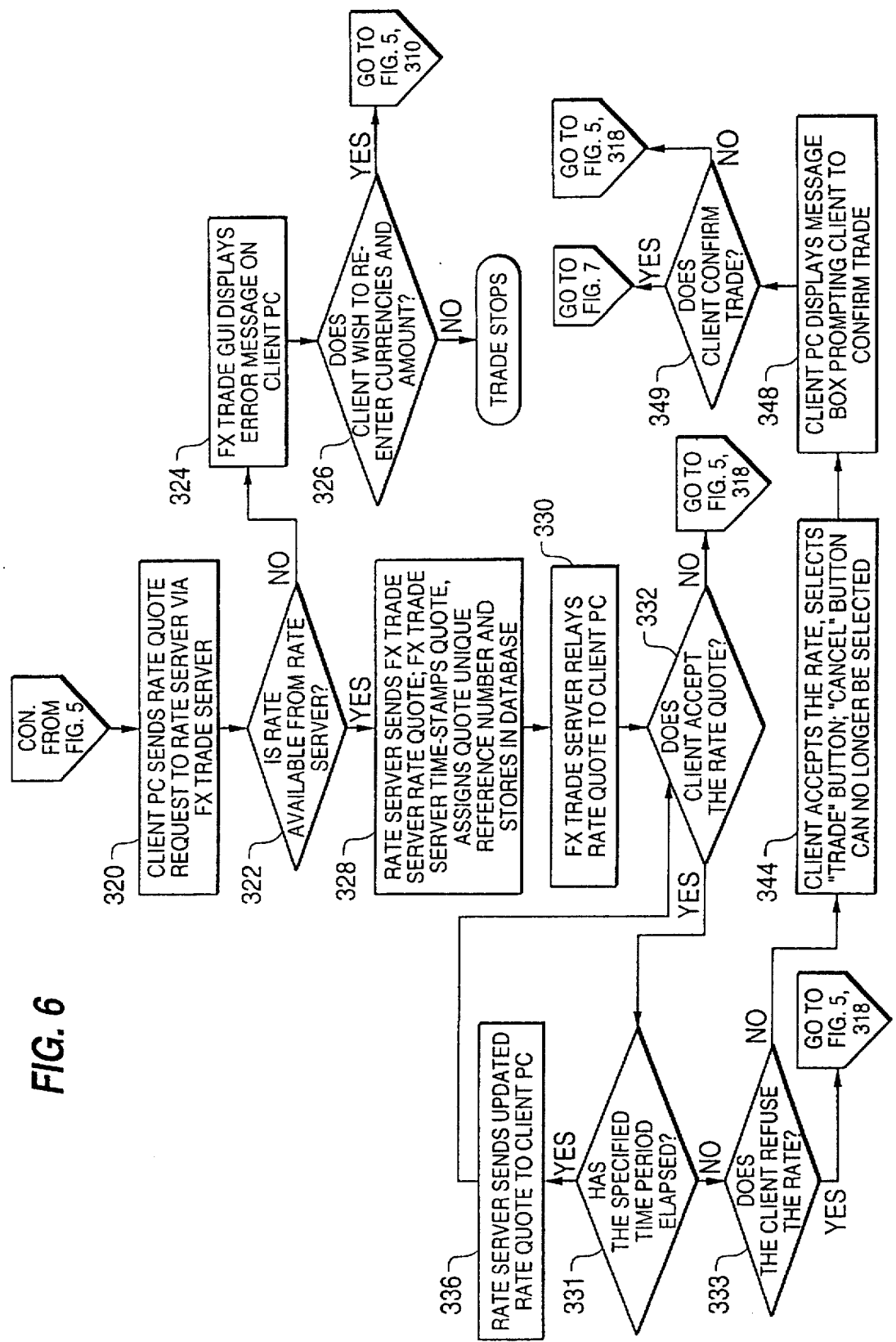

After the client selects an Entity and Account, they may select a currency for trade FIG. 5, 310. A list of valid currencies was sent to the client PC by Rate Server via the FX Trade Server upon log-in (see FIG. 4, element 230). The list contains the currencies' SWIFT codes and abbreviated currency names (for example, GBP=UK Pound). The list appears pre-sorted on the user's PC, divided into three subgroups—major currencies, secondary currencies and exotic.

Figure 8:
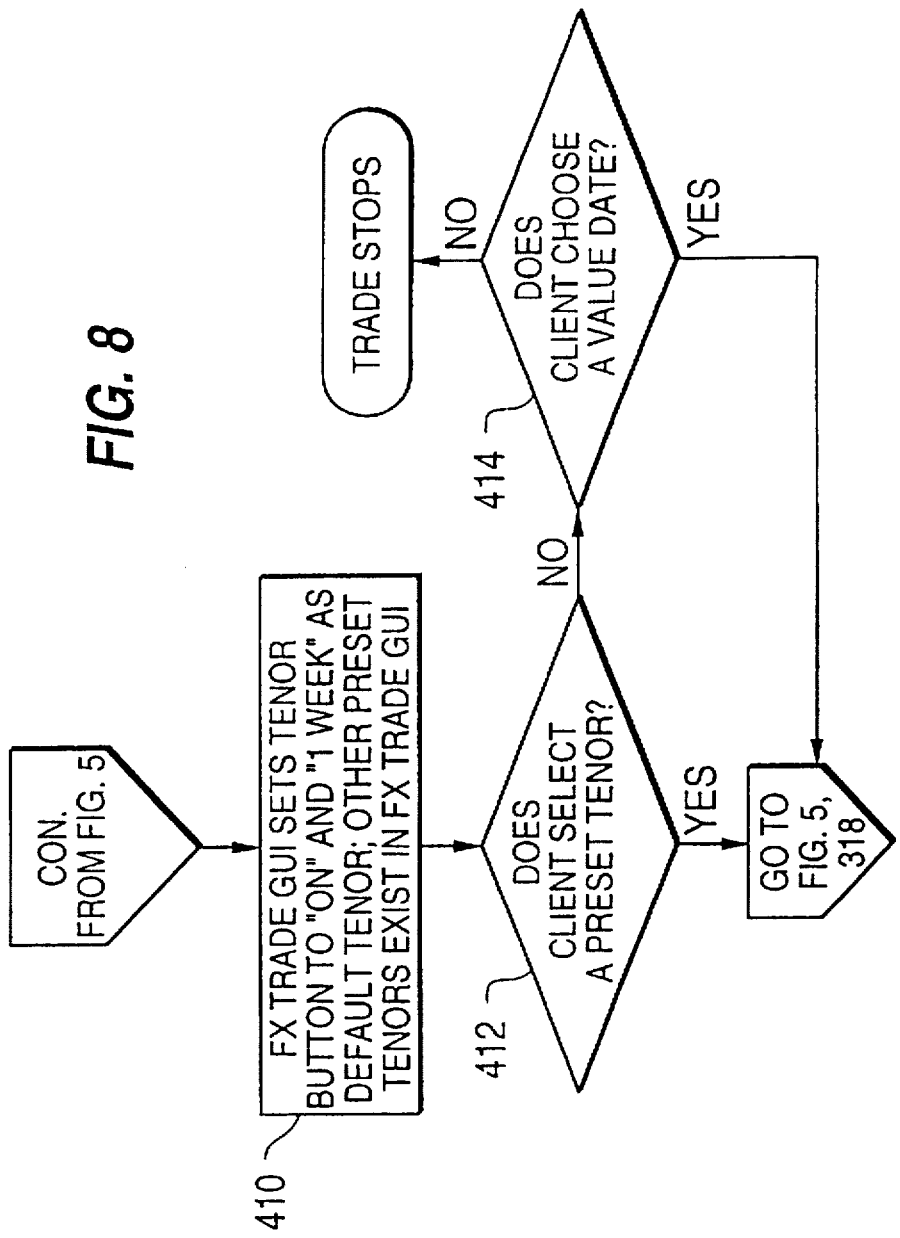
Figure 9:
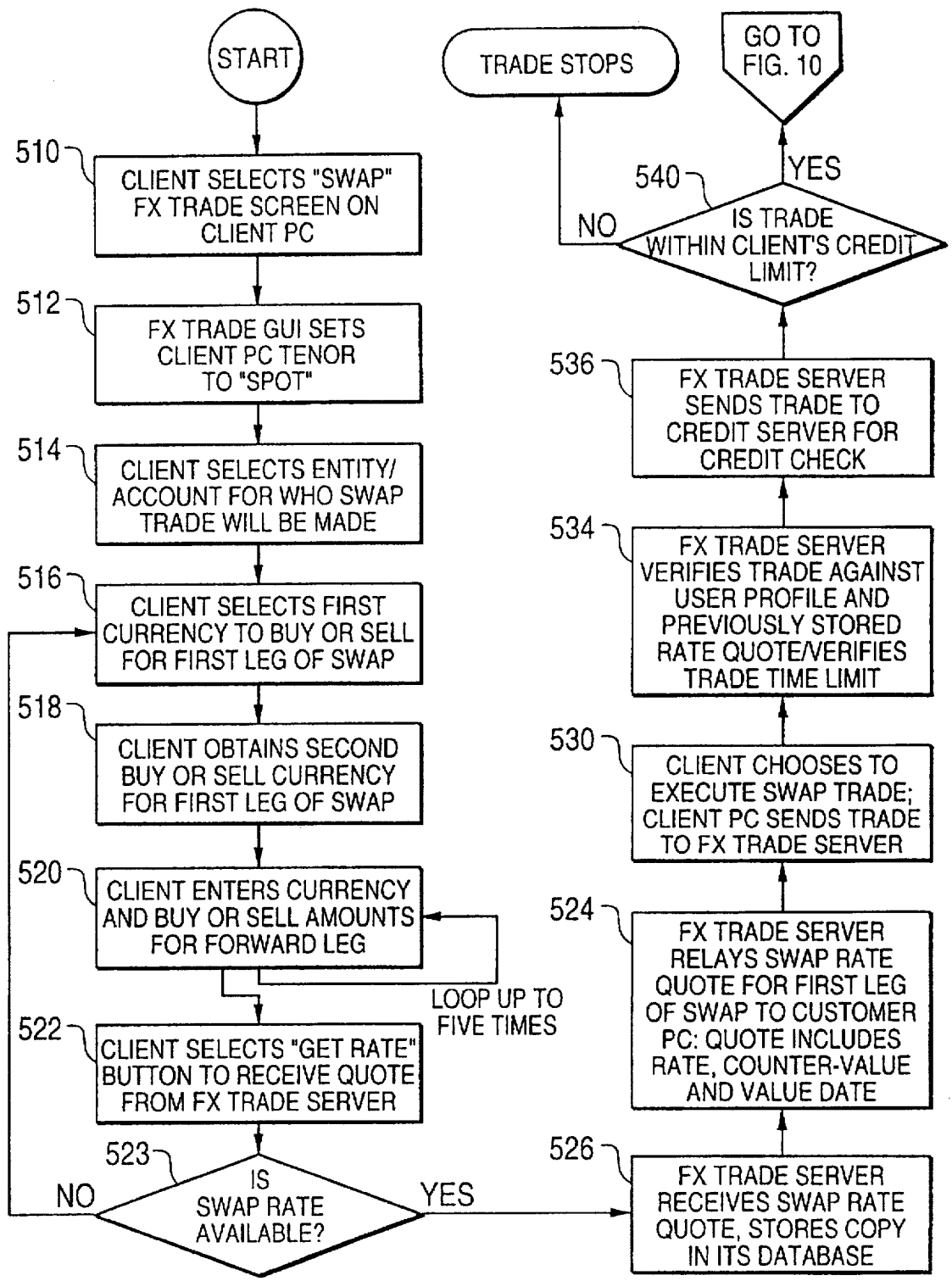
FIGS. 9–10 outline a swap trade using FX Trade.
Figure 10:
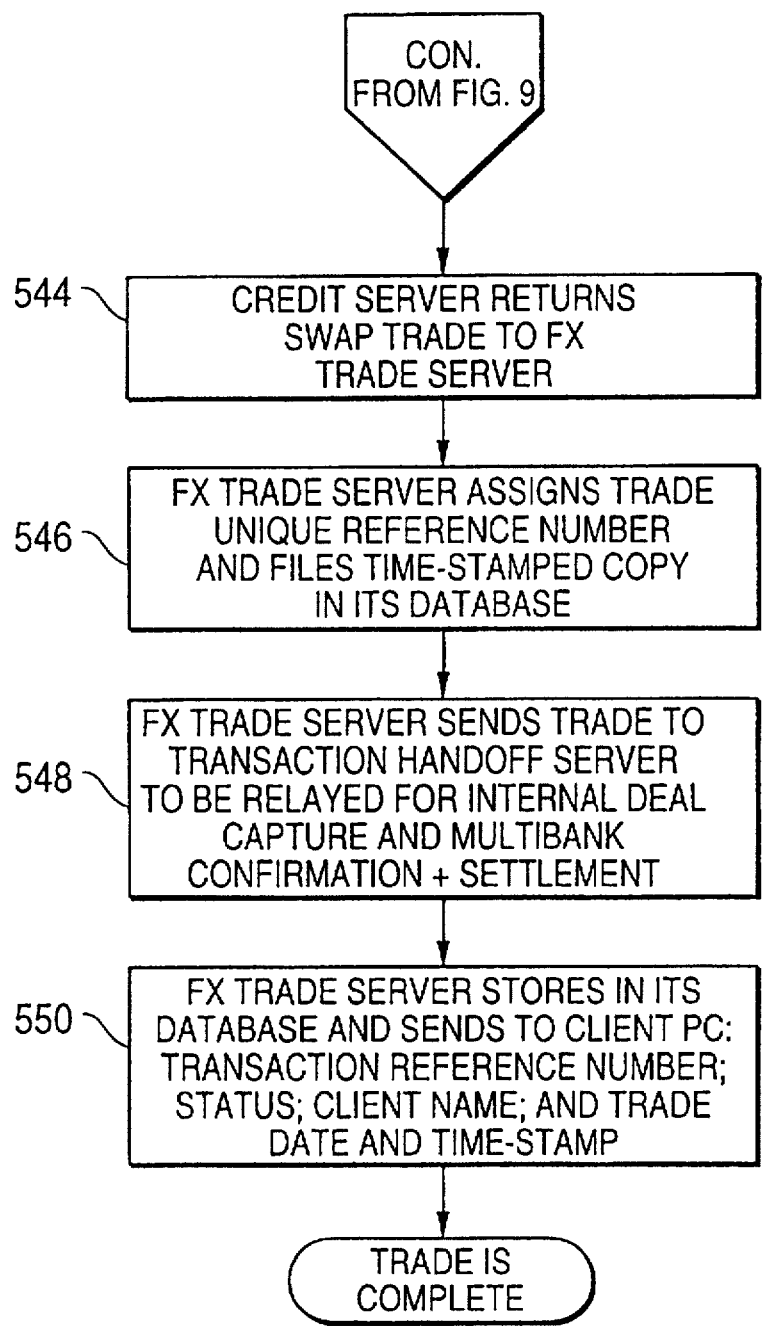

After selecting a specific type of currency to either buy or sell (see FIG. 5, element 310), the client PC will show only the available valid currencies for trade with the first currency selected, as was sent by the FX Trade Server upon log-in 312. The client must then select one of the available currencies for trade from the shown list (buy if the first currency selected 314). A client must then enter an amount for the currency to either buy or sell 316. After selection of currencies, 310 and 314, and currency amount to either buy or sell, 316, if the client chose spot from the FX Trade Order GUI "Enter" menu, then "spot" was set as the default tenor 302 at the time that spot was chosen 300. In the alternative, a client may choose a different pre-set tenor or a broken date to place a forward trade rather than a spot trade (refer to FIG. 8).

Once the above steps for the spot transaction (buy and sell currencies, 310 and 314; and buy or sell amount, 316) have been completed, the client may request the rate and terms 320 for the specific buy or sell currency entered. If a client requests a spot rate and the rates are unavailable, the client will receive an error message from the Rate Server via the FX Trade Server 324. The client can clear the error message and re-enter currencies and amount, or can return to the initial FX Trade GUI main entry screen 326.

If the client requests a spot rate and the rate is available, then the Rate Server sends the rate quote to the FX Trade Server; the FX Trade Server, in turn, stores a time-stamped copy of the rate quotation with a unique reference number. All FX Trade Server time-stamps are made using Greenwich mean time (GMT); however, adjustment for time display on a client PC can be made on a client-specific basis. The FX Trade Server then relays the requested rate quotation to the client PC 330 as adjusted by Pre-determined criteria in the FX Trade Server. The pre-determined criteria consists of spreads (i.e., additional percentages of the currency a mount or "mark-ups") to be added to the base quote at the financial institution's discretion and massaged, too, depending on the cash value of the transaction, respectively "tier" and "bands."

When the rate is received, the Term of the currency will be displayed by the client PC 332, as it was received at the time of log-in. The Term is validated on the client PC as it was received at the time of log-in, along with the valid currency list.

Once the client receives the rate 330, the client has a specified time period (5–15 seconds), as pre-set within the FX Trade Server, in which to accept the rate by choosing the "Trade" button on the screen 344. If the client does not accept the rate within the specified time period, then, upon request, the Rate Server via the FX Trade Server will send an updated rate to the client PC 336 for the client to accept or not accept 340, if the currency rate changes at any time past the specified time period. At any instant within the specified time period to select a rate, the client may obtain an updated rate from the Rate Server via the FX Trade Server by choosing the "Get/Refresh Rate" button 342, and will have another 5–15 seconds in which to accept or not accept the rate.

If the client decides to accept the rate, then the "Trade" button on the FX Trade screen is chosen 344. Following the selection of the "Trade" button, the client may no longer select the "Cancel" button to cancel the trade 346. However, after the Trade Button is chosen, a message box appears o the screen that gives a summary of the trade 348 (for example, the message box could state "You buy DEM 23,429.00@1.5248?") and allows the client another chance to cancel the trade 352. The client can choose to either accept or not accept the trade.

If the client chooses not to accept the rate, within the specified time period, then the client can clear the message box on the PC and return to the point where the rate was obtained FIG. 5, 318. If the client accepts the rate 354, within the specified time period, then the trade is released for execution 356. The client PC sends the accepted rate quote to the FX Trade Sever 358. The FX Trade Server looks up and matches the accepted trade against the rate quote previously stored in its database, as well as its copy of the user profile 360. Upon matching the trade against the rate quote, the FX Trade Server sends the trade to the Credit Server 362 to check the trade amount against the client's credit limit, as stored in the Credit Server's database.

If the client's trade exceeds pre-set limits in the Credit Server, the trade stops 366. If the client's trade is within pre-set limits in the Credit Server's database, the Credit Server returns the confirmed trade to the FX Trade Server 368. The FX Trade Server then stores a time-stamped copy of the trade in its database as a "released" trade 370.

The FX Trade Server then sends the released trade to the Transaction Hand-off Server 372, which in turn directs the trade to the financial institution's Deal Capture System (see FIG. 1, element 34). At the same time, the FX Trade Server sends a copy of the trade to the MultiBank Confirmation and Settlement System 30.

Figure 7:
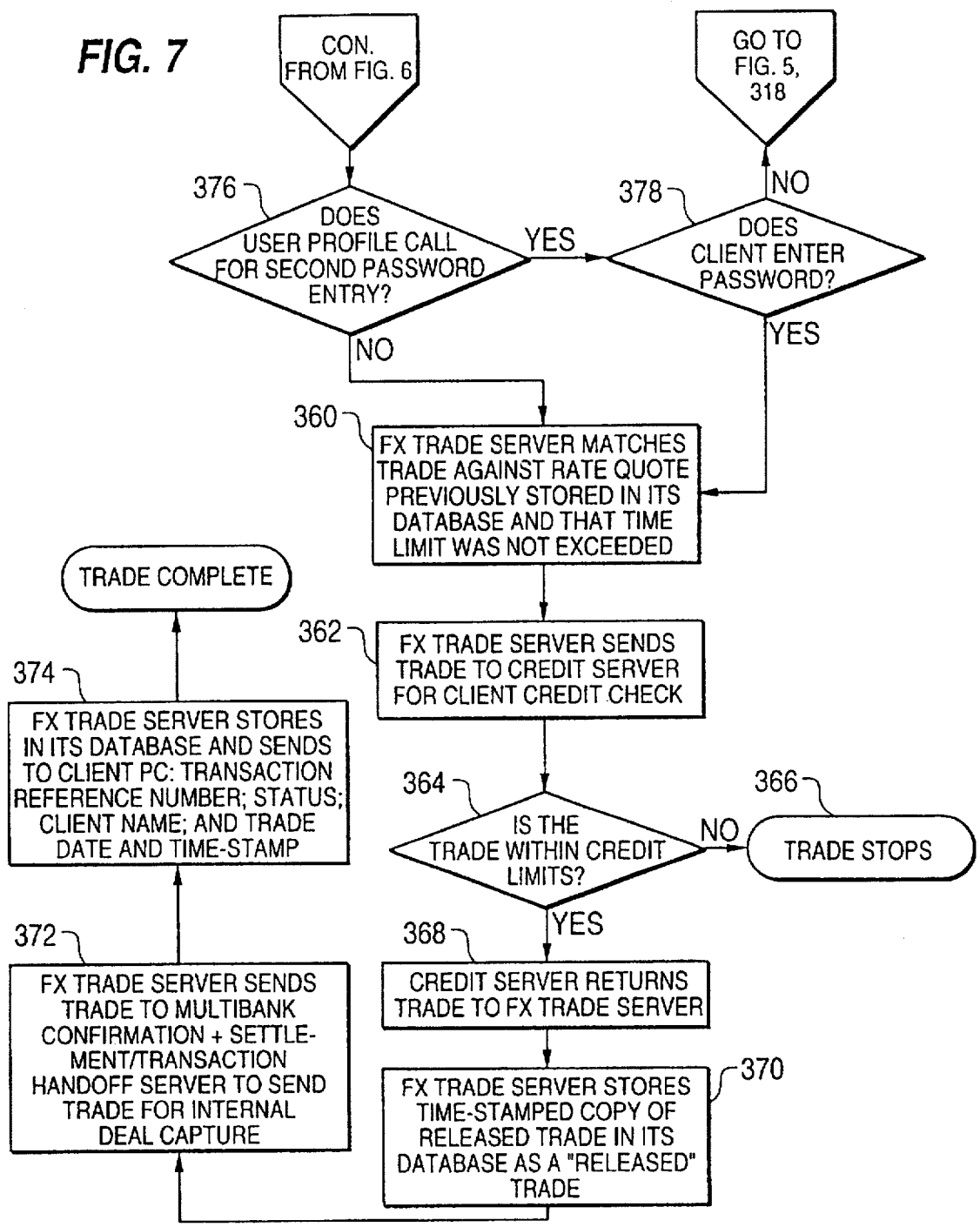

Depending on pre-set criteria for the client as contained in the client PC and the FX Trade Server's user profile, a client may have to enter their password a second time before accepting the trade for release (see FIG. 7, element 376). Alternatively, the user may choose to not accept the trade and return to the point where the rate was obtained (see FIG. 5, element 318).

Once the trade has been released, then the FX Trade Server sends the client PC the following details of trade (all of this information also being stored in the FX Trade Server's database): Transaction Reference Number; Status, whether released or not released; the name of the person who entered the trade; and the transaction date and time-stamp (see FIG. 7, element 374).

In another trading scenario, clients may use the FX Trade Server for forward trades (a "forward trade" occurs when the value date, or settlement, of a transaction occurs at a predetermined future date). The process of performing a forward trade using the FX Trade Server corresponds to that of performing a spot trade with the differences as described below. After a client chooses "Forward," the FX Trade GUI sets the "Tenor" button to "on" and 1 week as the default tenor (see FIG. 8, element 410). A client may use the default tenor or choose from a list of alternate pre-set tenors (for example, 1 month, 3 months, 1 year, etc.).

Alternatively, the user may select the "Value Date" button and choose a broken date for the trade 414, to be entered in a day-month-year format. From this point, the trade flow follows the same path as the spot trade; however, when the FX Trade Server returns the rate to the client PC, it also returns the rate's associated forward points, which allow for the differences in interest rates between the two selected currencies. Forward points are a function of the currencies selected and the tenor.

Clients with two-way pricing capability, verified as such by the user profile in the FX Trade Server, are able to receive two-way price quotes to make spot or forward trades. Clients obtaining two-way rate quotes for spot or forward trades follow the same trade flow as for one-way spot or forward trades (refer to FIGS. 5–8). However, the client does not indicate which currency is to bought and which currency is to be sold until after the quotes are received from the FX Trade Server. The Client then selects the "Get Rate" button, and the FX Trade GUI responds with two rates, one for buying the foreign currency and the other for selling the foreign currency. At the time that the client obtains the rate, the Terms are displayed on the client PC. At that point, the client must declare if he is a buyer or seller for that particular transaction by selecting either the "You Buy" or "You Sell" button. These buttons do not appear on the one-way trade screens and cannot be used until the rate is obtained.

For example, if a client input GBP for the first currency, USD for the second currency, and input an amount for GBP, then the client would have to choose to either buy GBP for USD or sell GBP for USD after receiving the rate. Once the client chooses to either buy or sell, then a message box appears o the screen, stating s summary of the trade so as to allow the client a last chance to confirm or deny the trade. A "Yes" and "No" button appears in the message box to either accept or deny the trade.

If the client denies the trade, then the message box clears and the client is returned to the two-way trade main entry screen. If the client accepts the trade, then the trade is released and sent from the client PC to the FX Trade Server, where it follows the same path as a one way spot or forward trade (refer to FIG. 5).

In another scenario, clients can use the FX Trade Server to perform swap trades. The initiate a swap trade, a client selects "Swap" from the "File" menu of the FX Trade GUI initial main entry screen. The GUI then provides the swap main trade entry screen 510 (refer to FIG. 17). From this point until the time that the trade is executed, the client may cancel the trade and return to the FX Trade GUI initial main entry screen. A client next selects an entity/account from a list of valid entities and accounts for which they are authorized to trade 514, as was sent to the client PC by the FX Trade Server upon log-in. The entity/account list may not be revised by users and is maintained by the financial institution on the FX Trade Server.

After a client selects an entity and account, they may select currencies to buy or sell for the first leg of the swap 516. The client then chooses a second buy or sell currency from a list currencies available for trade with the first currency, as was sent to the client PC by the FX Trade Server upon log-in 518. The client then must input an amount for either the buy or sell field 520. Because the first leg of the swap trade is made at an underlying spot rate, the FX Trade GUI on the client PC sets the tenor to "Spot" 512.

At this point, the client may enter up to 5 additional swap legs, for a total allowance of six swap legs 528. The client enters this information onto the spreadsheet on the FX Trade swap trade screen. The information entered by the client includes the forward leg tenor or value date, the forward currency and forward currency amount for each additional leg. After entry of any additional legs, the client may obtain a rate 522 for the swap trade. The client PC receives the rate from the Rate Server via the FX Trade Server 524, which stores a time-stamped copy of the quotation in its database 526. The FX Trade Server, after adjusting the rate by pre-determined criteria, sends the client PC the rate, counter-value and value date. For each additional leg, the Rate Server via FX Trade Server returns to the client PC the forward leg rate, forward leg points and the forward leg counter-value.

Once the client chooses to trade, the client PC sends the trade to the FX Trade Server 530, which verifies the trade against the user profile 534 and matches the trade against the previously stored and time-stamped rate-quote. The FX Trade Server sends the trade t o the Credit Server 536, which verifies the trade against the client's trade limits in the Credit Server's database 540.

If the trade is not within the client's credit limit, the trade stops. If the trade is within the client's credit limit, then the trade is sent back to the FX Trade Server 544. The FX Trade Server files a GMT time-stamped copy of the trade in its database 546 and then send the trade to the Transaction Hand-off Server 548. From the Transaction Hand-off Server, the trade is sent to the financial institution's Deal Capture System (see FIG. 1, element 34). At the same time, the FX Trade Server sends a copy of the trade to the MultiBank Confirmation and Settlement System 30.

Depending on pre-set criteria contained in the user PC for the user profile, a client may have to enter their password a second time before accepting the trade for release (refer to FIG. 7, element 376).

Once the trade has been released, then the FX Trade Server sends the client PC the following details of the transaction status (all of this information also being stored in the FX Trade Server's database): Transaction Reference Number, Status, whether released or not released; and the transaction date and time stamp 550.

Additional functionality is available from the FX Trade GUI on the client PC. A client can review all FX Trade transactions from the "View Transactions" screen (see FIG. 18). Clients can view transactions between certain specified dates or view all transactions. FX Trade transactional information on the "View Transactions" screen includes—transaction date, buy currency type and amount, sell currency type and amount, transaction (FX) rate, value date, reference number assigned by the FX Trade Server, and Status.

In another application, authorized clients may use the Money Market application for short-term deposits of foreign currencies at a specified deposit rate. The financial institution swaps the foreign currency into USD for the deposit's duration, and, at the end of the duration, swaps the USD back into the original foreign currency, along with interest accrued over the at the specified deposit rate. This application may be of use for an entity which will hold foreign currency for a relatively short period of time and wishes to earn interest on that currency during that time. Further, the entity itself does not wish to participate in the foreign exchange market. The Money Market Server uses rates obtained from the FX Trade Server for FX rates and forward points. USD interest rates are manually input into the Money Market Server by financial institution personnel.

Figure 19:
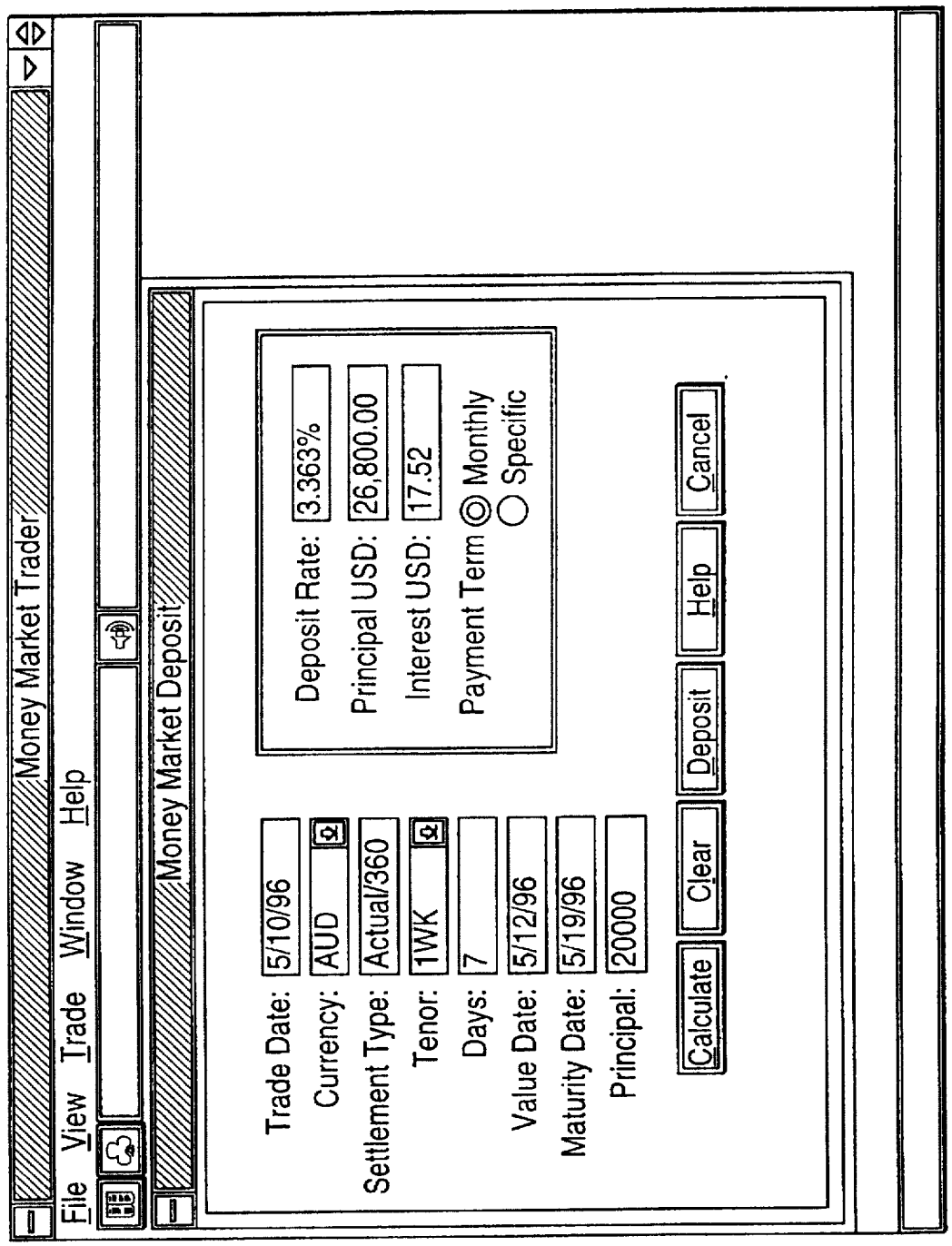
FIG. 19 represents a Money Market Deposit screen.

A client may access the Money Market Server using the log-in process that FIGS. 3–4 outline. The Money Market GUI presents the client with a Money Market Deposit screen (refer to FIG. 19). The Money Market Server accommodates smaller deals and larger deals. The larger deals have a threshold amount that cannot be exceeded, or the deal stops.

Figure 11:
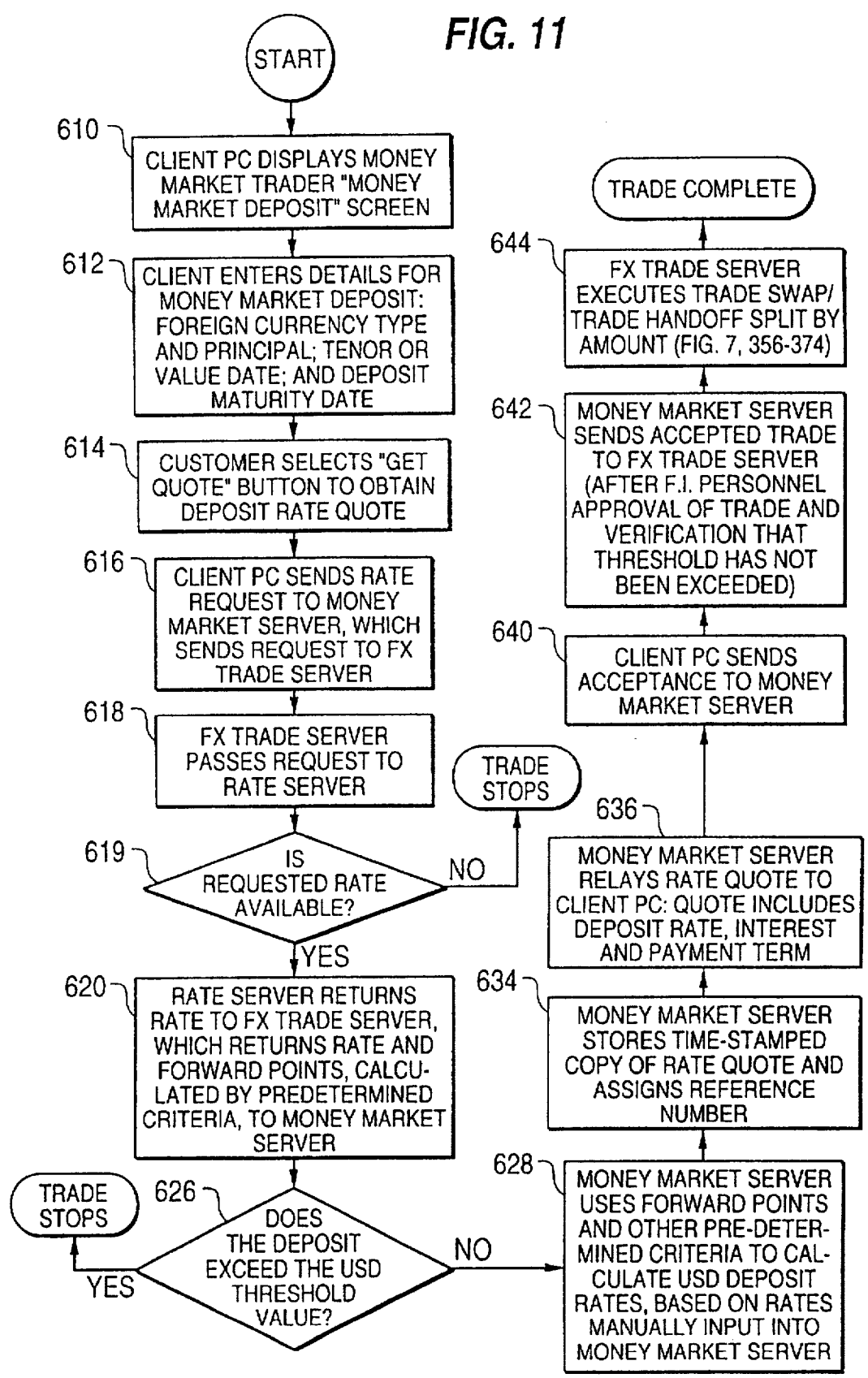
FIG. 11 outlines a Money Market Trade.

Once the client PC displays the Money Market Trader "Money Market Deposit" screen (see FIG. 11, element 610), the client can enter the details of a deposit of foreign currency 612. This includes—the foreign currency, tenor or value date, maturity date of the short-term deposit and foreign currency principal (refer to FIG. 19). Upon entering this information, a client may select the "Get Quote" button to obtain a deposit rate quotation 614.

The Money Market Server receives the "Get Quote" request and sends this information to the FX Trade Server to obtain an FX rate and forward points for the foreign currency entered against USD 616. The FX Trade Server requests and obtains, if available, a rate from the Rate Server 618 and returns the rate and forward points to the Money Market Server 620. If there is no rate available, or if the FX Trade Server is closed for trading then the trade stops.

Figure 20:
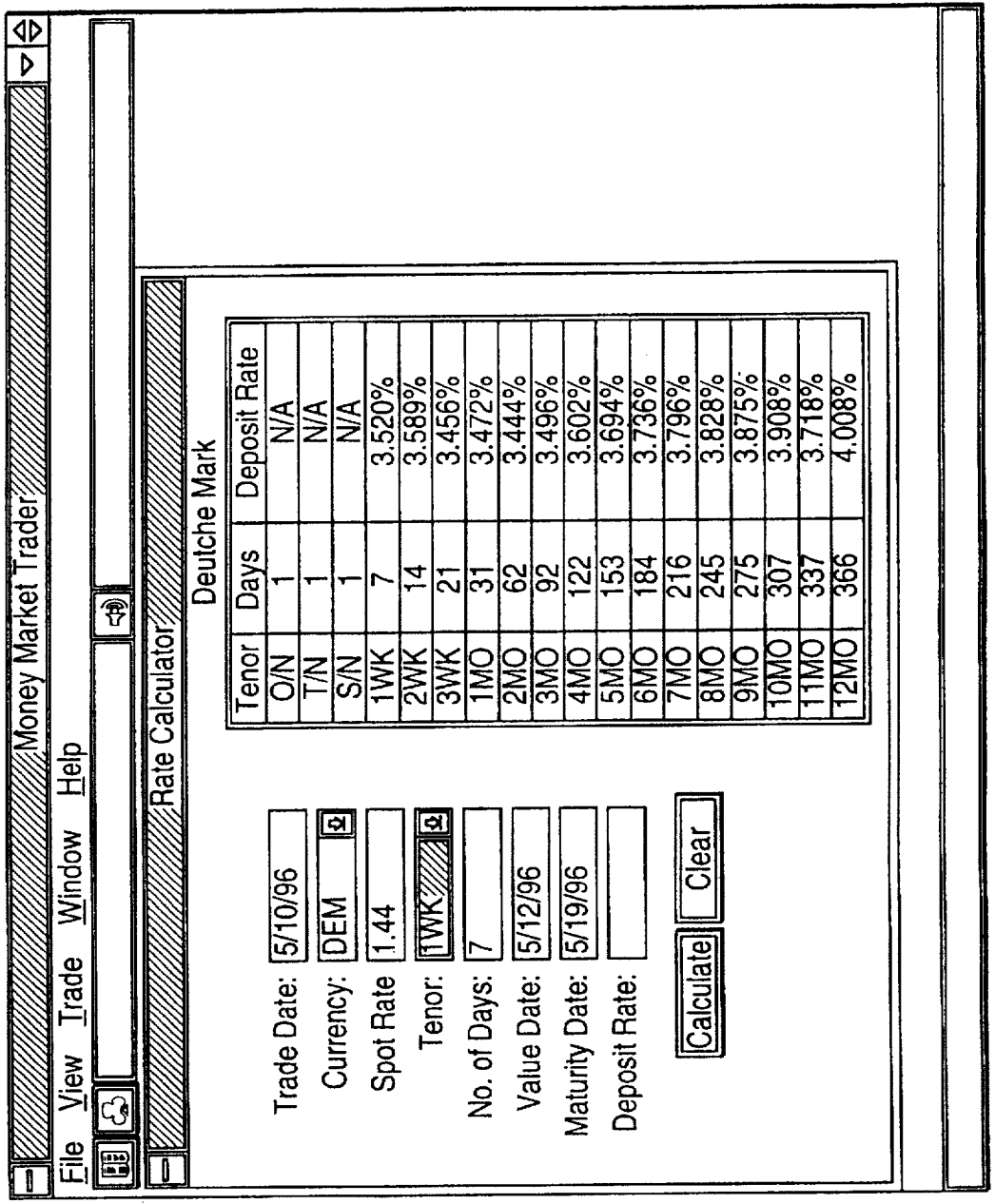
FIG. 20 represents a Money Market rate calculator screen.

After confirmation that the USD threshold has not been exceeded, the foreign exchange rate, forward points, USD interest rate and other pre-determined criteria are used to calculate deposit rates 626 to be returned as a foreign currency interest rate to a client 628. Smaller Money Market deposits are carried out between the client PC and the Money Market Server. Larger Money Market deposits are carried out at the discretion of designated financial institution personnel 632. Deposit rates are calculated by the Money Market Server—deposit rates can be calculated using specific FX rates and tenors using the "Rate Calculator" (refer to FIG. 20). The USD interest rates, received from external sources are manually input by the financial institution into the Money Market Server, reviewed and, if necessary, updated, approximately once per day.

Financial institution personnel can view the Money Market Trader "Rate Calculator" screen (see FIG. 22) that shows the following—trade date, currency, spot rate, tenor, value date, deposit maturity date, in addition to USD interest rates, forward points (bid and offer), and foreign currency Money Market bid and offer rates.

The Money Market Server stores a time-stamped copy of a quoted rate with an assigned reference number 634, and, then, relays this information to the client PC 636. The information that the Money Market Server sends to the client PC includes the foreign currency Money Market bid and offer rates, USD interest, equivalent USD deposit principal and payment terms 636.

If the client accepts the rates, then the client PC sends the acceptance back to the Money market Server 642, which sends the FX portion of the trade to the FX Trade Server 644. The FX Trade Server, after matching the rate quotation, time-stamp and user profile, executes the FX portion of the trade (refer to FIG. 7, elements 362–374).

A client has the option of a deposit rollover any time prior to two business days before the deposit's maturity date. After receiving permission from designated financial institution personnel, a client may, by selecting "Trade" and, then, "Rollover" from the Money Market Trader "Transactions" screen (see FIG. 21), enter the trade details for a certain previously placed Money Market deposit to be rolled over.

Figure 21:
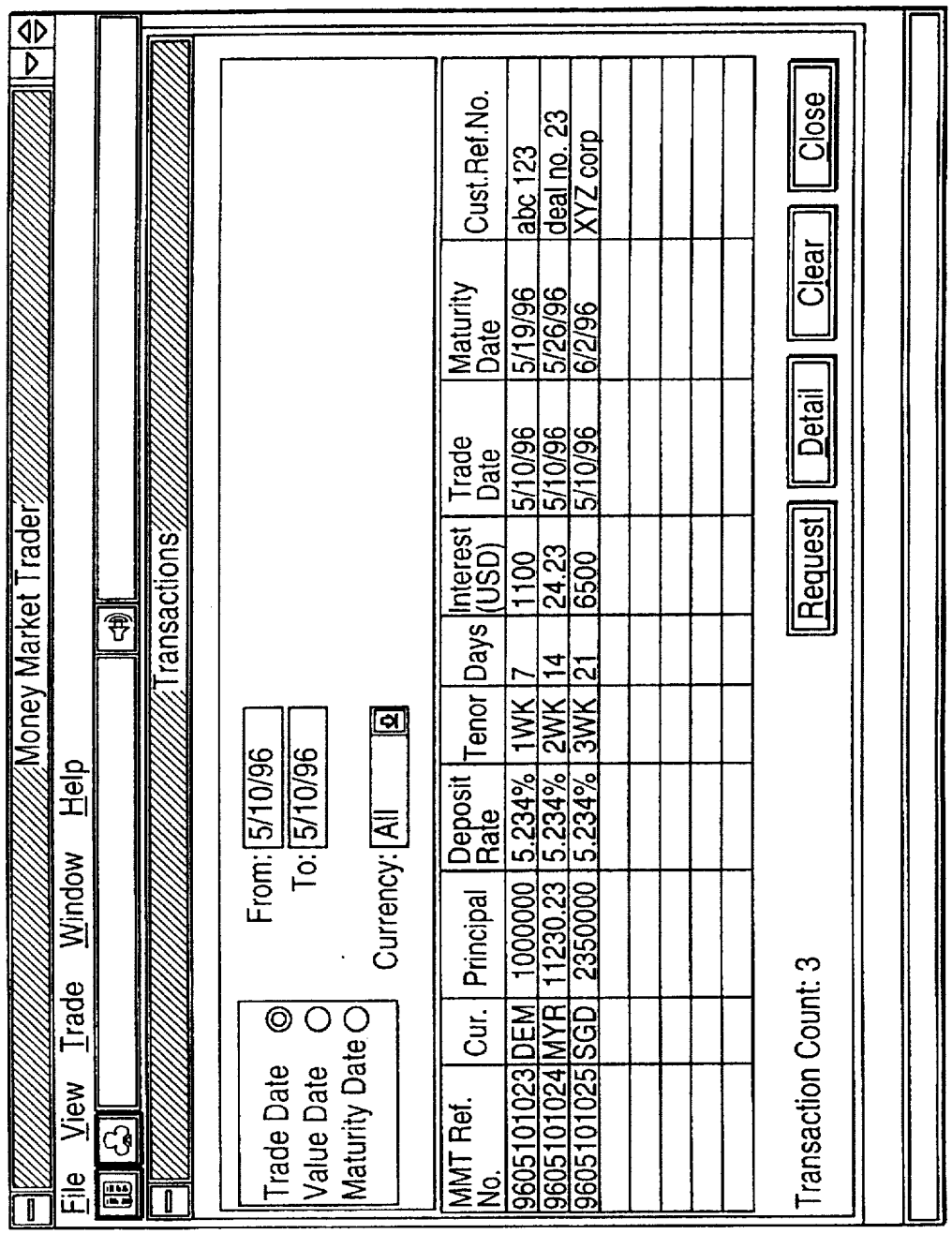
FIG. 21 represents a Money Market transactional records screen.

Clients may view Money Market deposits on the "Transactions" screen (see FIG. 21). Money market "Transactions" screen information includes the following—Money market Server reference number, foreign currency exchanged by FX Trade Server, principal, foreign currency deposit rate, tenor, USD interest amount, trade date, maturity date and customer reference number.

Clients may view Money Market deposits on the "Transactions" screen (see FIG. 21). Money Market "Transactions" screen information includes the following—Money Market Server reference number, foreign currency exchanged by FX Trade Server, principal, foreign currency deposit rate, tenor, USD interest amount, trade date, maturity date and customer reference number.

In an additional application, authorized clients may place different variations of leave orders for spot and forward trades using the FX Order Blotter for order tracking, which, in turn, uses the FX Trade Server for transaction execution. A client PC logs-in to the FX Order Server using the process that FIGS. 3–4 illustrate. The FX Order Server contains copies of user profiles in its database. It sends a copy of the user profile to the client PC 222.

Additionally, FX Order classifications for users at a client's location, such as Order Entry and Order Management, reside in the FX Order GUI in the client PC.

Figure 12:
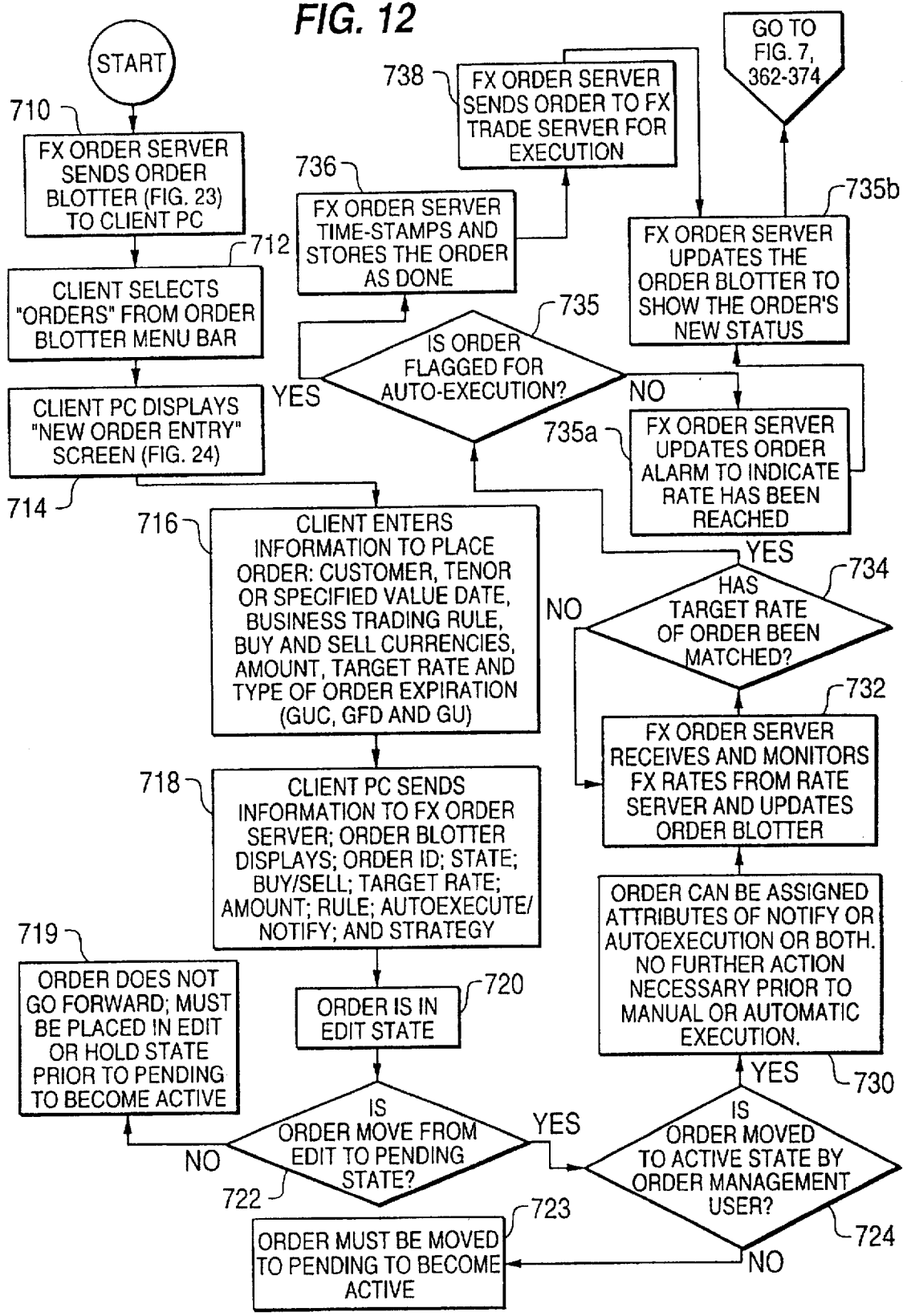
FIG. 12 outlines FX Order entry.
Figure 23:
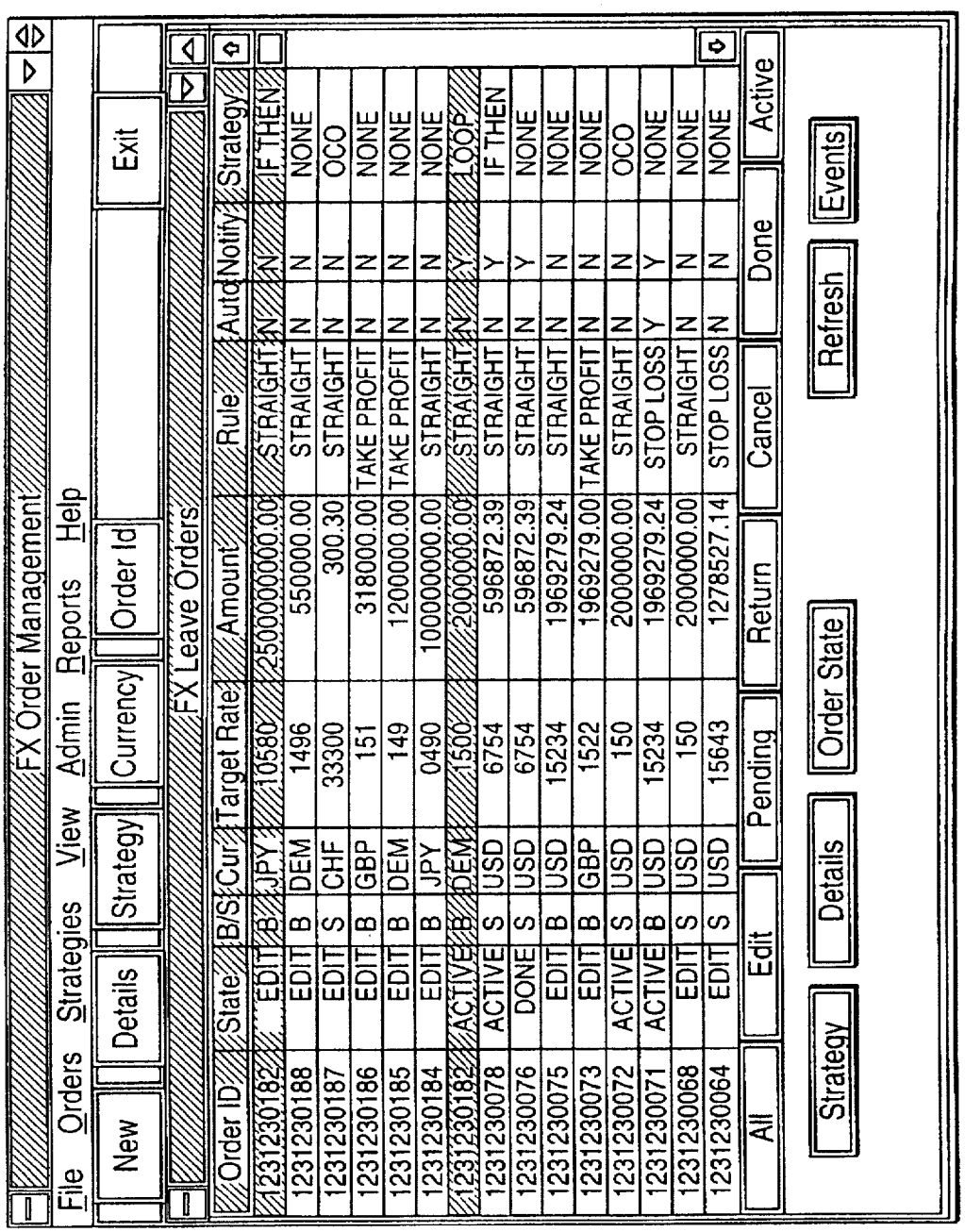
FIG. 23 represents an FX Order Blotter.

A client user encounters the FX Order Blotter (refer to FIG. 23) upon logging-in to the FX Order Server (see FIG. 12, element 710). The FX Order Blotter displays orders in reverse-chronological arrangement by order placement. There are three modes in which a client may use the FX Order Server:

Client Order Management Mode: in this mode, clients can place orders. Clients can organize and track orders on the Order Blotter. The Order Blotter records all orders (see FIG. 24).

Autoexecution Management Mode: in this mode, the user can place leave orders for spot or forward trades. If the orders are within certain parameters, the FX Order Server will send the order to the FX Trade Server for autoexecution (see FIG. 24).

Leave Order Management Mode: in this mode, the client releases any order for financial institution management or execution or both. These typically orders over a certain threshold currency amount so as to obtain the best rates. The parameters for filling the order are determined by the expiration date.

Leave orders are valid or invalid at the client's discretion, that is, a client (Order Entry or Order Management user) may cancel a leave order, manually, at any time before the FX Order Server sends an order to the FX Trade Server for execution. There are three primary qualifying factors that govern when the FX Order Server will automatically cancel or not cancel a leave order, as the "New Order Entry" screen (see FIG. 24) shows:

Good For Day (GFD): At the time of the client's log-in, when the FX Order Server sends the user profile to the client PC, each client, at any location, will receive the GFD option. Under GFD, if the entered order's specifications are not reached by the end of the business day in that client's region, known as part of the user profile, the FX Order Server will automatically cancel the leave order.

Good Until Cancel (GUC): GUC places the burden of canceling an order on the a client. Clients can specify a specific date and time for receiving a GUC reminder from the client PC (see GU, below). GUC places no time limitation regarding order validity. GUC only warns (in the form of an audio and visual cue) a client when two months have lapsed from the time that an order was activated by a user at a client with Order Management privileges, that is, from the time the leave order was placed for autoexecution at a target FX rate. It is the client's responsibility to respond or not respond to a GUC flagged order warning. A client can run a report at any time to view all outstanding orders sorted by their GUC dates.

Good Until (GU): Using a GU order, clients can specify a date and time for receiving a GUC reminder. For example, a client can specify a particular date and time when it is known that the client will be able to review and address a GUC reminder at the client PC. At a client location, there are two types of individuals who may use the FX Order Server—Order Entry and Order Management. Any single person may be entitled to privileges of both types as determined on a client-specific basis.

The following table illustrates the different Order Entry and Order Management privileges in terms of the different states of a placed order.

|  | Order Entry | Order Management |
| --- | --- | --- |
| Edit: | * |  |
| Pending: | * |  |
| Cancel: | * | * |
| Active: |  | * |
| Done: |  | * |
| Hand-off: |  | * |
| Pass: |  | * |
| Return: |  | * |

After the FX Order GUI displays the Order Blotter on the client PC, an Order Entry client wishing to place an order selects "Orders" from the Order Blotter menu bar 712. The client PC displays the "New Order Entry" screen 714. A client enters the required information—tenor or specified value date, pre-set business rule for trading (either Straight, Take Profit or Stop Loss), buy and sell currencies, buy amount, target rate and selection for when an order will expire in the FX Order Server, as the Order Blotter will reflect, namely, either GUC, GFD or GU 716 (see FIG. 24).

Once the above information is entered, the Order Blotter displays the following information concerning the order, all of which is sent to the FX Order Server, which stores the information in its database: Order ID (assigned by the FX Order Server); State; Buy/Sell Target Rate; Amount; Rule (business rule for trade); Auto (Autoexecute) or Notify or both; and Strategy 718.

In this instance of order placement, the order is in an Edit state 720. An Edit order can be moved to a Pending state by the Order Entry user. Alternatively, from the Edit state, an order can be moved to a Cancel or Edit (again) state.

The originating or other Order Entry client can move an order from the Edit state to a Pending state, from which it can be moved into an Active state by an Order Management individual 724.

If an Order Entry user places the order in a Pending state, it remains as Pending on the client's Order Blotter until an Order Management user moves it into an Active state.

Pending orders may shift from Order Entry to Order Management users, but not the reverse. Alternatively, a Pending order can be moved to a Cancel or Edit state. Once an Order Management user makes an order Active, then it remains in that state for ongoing client management until the order transitions to Done, Return, Handoff, Pass or Cancel.

An Order Management user cannot execute or flag an order for Autoexecution if it is in the Return state; rather, the order has been sent back to Order Entry for further activity.

An order in the Handoff state has been flagged for further management, and possible execution, by the financial institution directly. An Active order can be assigned either or both Notify or Autoexecute attributes before changing to a Handoff state.

If the Order Management user wishes no further order management prior to execution, then the user can assign an Active order the attributes of either Notify or Autoexecute or both 730. Notify is set by selecting the Notify button on the Order Blotter, after which the order is color-coded for client notification of target rate match. The FX Order Server regularly receives and monitors FX rates received directly from the Rate Server, and updates the Order Blotter accordingly 732. In turn, the client PC, when receiving the updated Order Blotter information from the FX Order Server, gives an audio and visual warning when an order is 3% away from a target FX rate and changes the color-code. The warning is repeated when an order is 1% away. If not set to Autoexecution, it is the Order Management user's responsibility to execute the transaction, if the market rate matches the target rate, if he so chooses. Alternatively, he can let the rate "trade through," that is, if and when the market rate and target rate match, as monitored by the FX Order Server, no execution takes place. If manually trading, the client user must update the Order Blotter himself to place the order into a Done state from the Active state.

If an order is set to Autoexecute, once the order's target FX rate has been met, as determined by information sent to the FX Order Server by the Rate Server 732, the FX Order Server will send the Autoexecute order to the FX Trade Server for execution 738 (refer to FIG. 7, elements 362-374). The FX Order Server automatically transitions the order state from the Active to Done and updates the Order Blotter as such.

If an order is in a Pass state, then that order is part of an entire Order Blotter that is being passed to a client business unit in a separate client business region. Individual orders cannot be assigned the Pass state. This receiving client business unit assumes all responsibility for order management and possible execution of the orders that constitute the passed Order Blotter, including all of the orders' associated states and strategies. Passing of Order Blotters is performed at the end of the business day in that client's local time.

An order in a Done state has been time-stamped and stored by the FX Order Server 736, and automatically executed by the FX Trade Server 736 (refer to FIG. 7, elements 362-374). An order can be placed into the Cancel state (a privilege shared by Order Entry and Order Management users) if it has not been executed, that is, is not in a Done state.

FX Order Strategies allow orders to be linked to other orders under certain conditions. The Order Blotter indicates orders' Strategies, if any. This includes: allowing an Active order to be set to another order to Cancel if the Active order is Done (OCO); setting an Active order to execute only if another designated Active order executes (IF/THEN); selecting orders for placement in loops so that orders effect each other in different ways depending on each selected order's individual state (LOOP); and selecting a group of orders and assigning specific states to each order (OCORE).

FIG. 25 illustrates the FX Order "Customer View" screen. The screen's information includes—Instructions (entered onto the screen freeform, as a message to users), entity, tenor, value date, counterparty, client reference number (from user profile), currency, target spot rate, execution rate, contract rate, and difference. The latter provides a profit and loss (P & L) analysis of the difference, if any, between the contract rate and the execution rate of a leave order in the Done state.

In an additional application, the Payment Order Server (see FIG. 2, element 104) allows a financial institution customers to make foreign currency payments to other private entities in USD. The Payment Order Server receives messages for transactions to be sent to the FX Trade Server for execution. The Payment Order Server breaks down those messages into components that the FX Trade Server 100 can make use of to execute the transactions (refer to FIG. 7). User profile validations are performed by the FX Trade Server prior to trade execution; the Payment Order Server does not perform the validations. Upon receipt and validation of Payment Order messages, the FX Trade Server executes the currency transactions (refer to FIG. 7).

Figure 13:
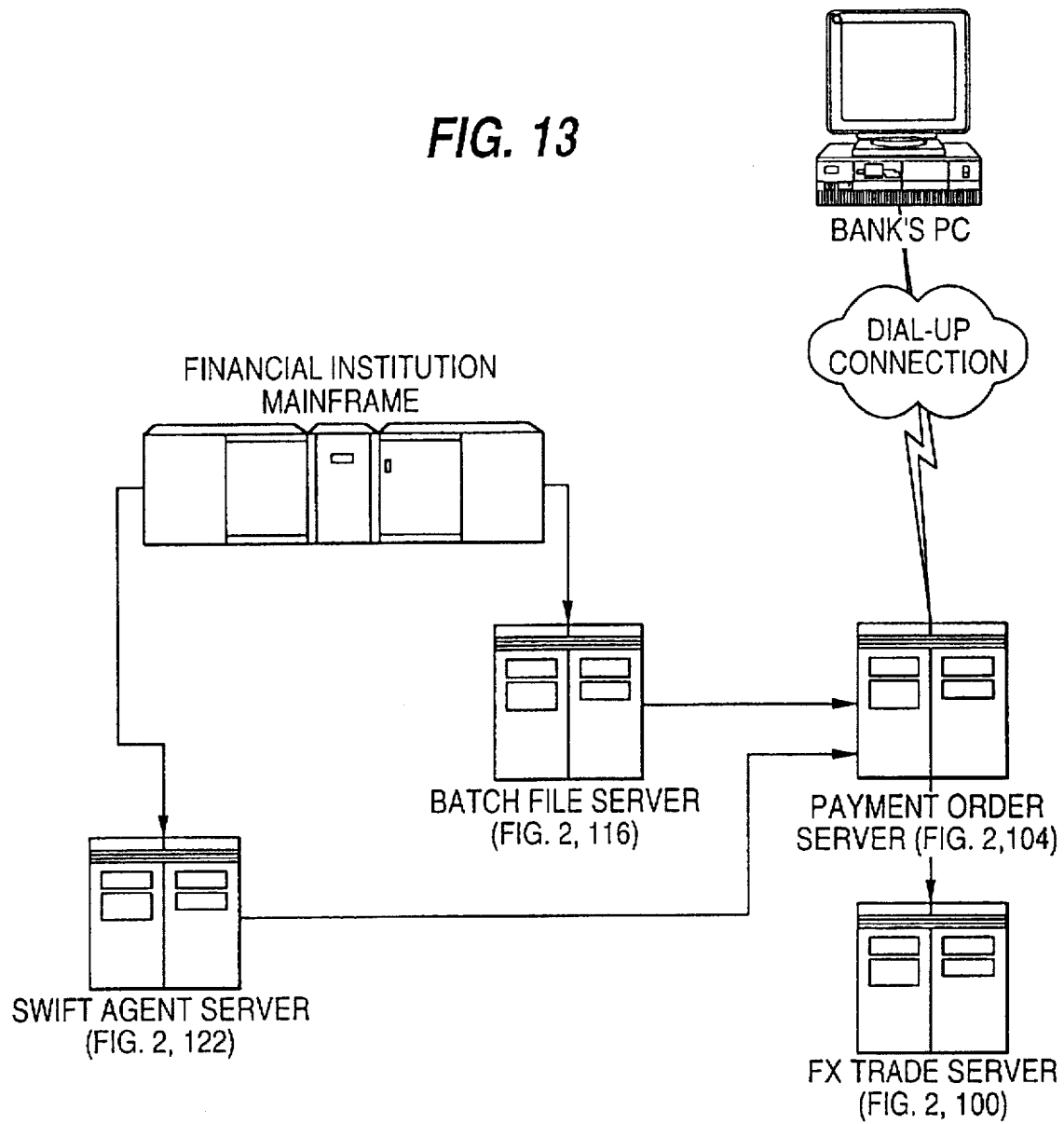
FIG. 13 outlines the flow of Payment Order messages.
Figure 27:
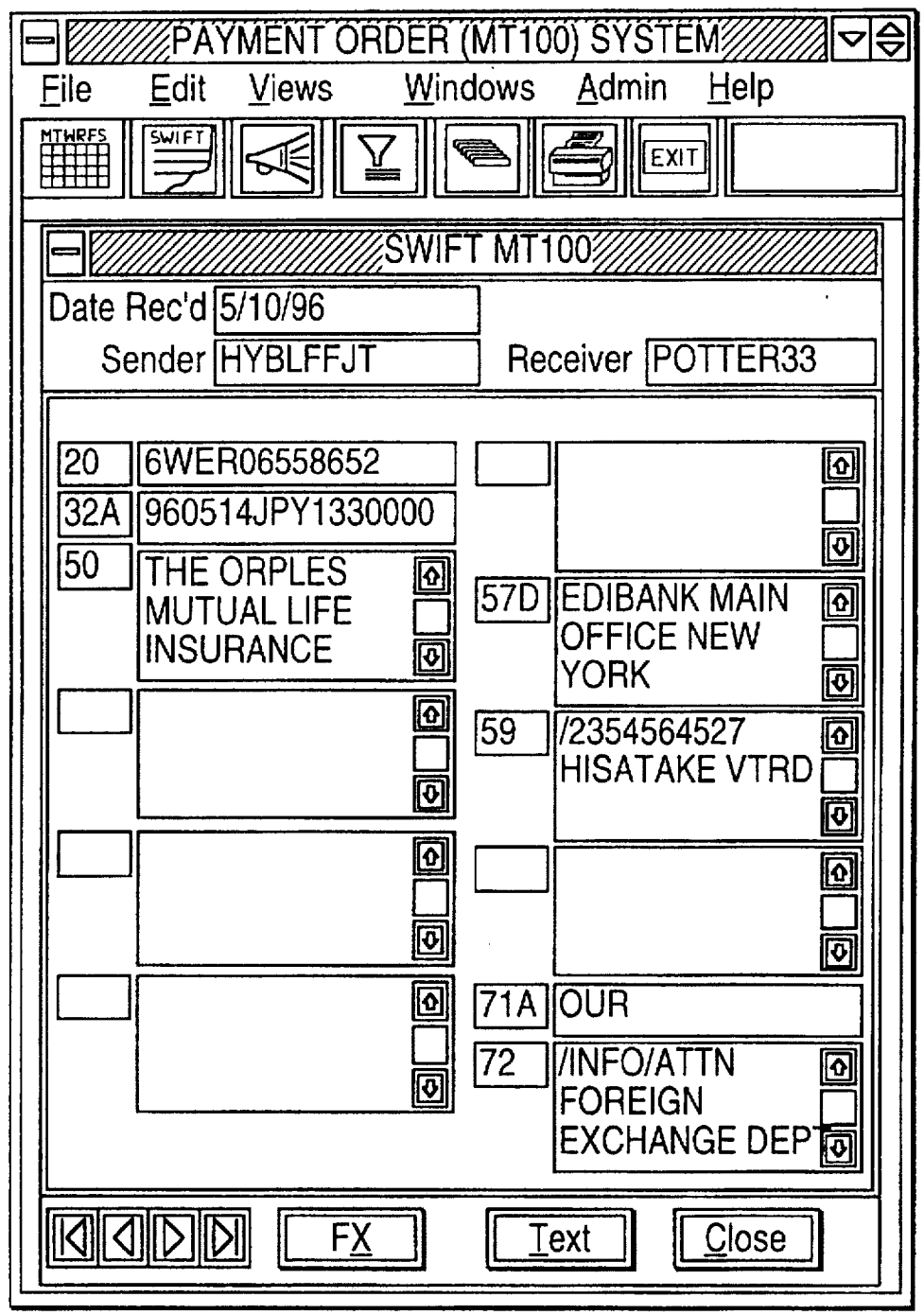
FIG. 27 represents a message to the Payment Order Server, parsed from its original form.
Figure 28:
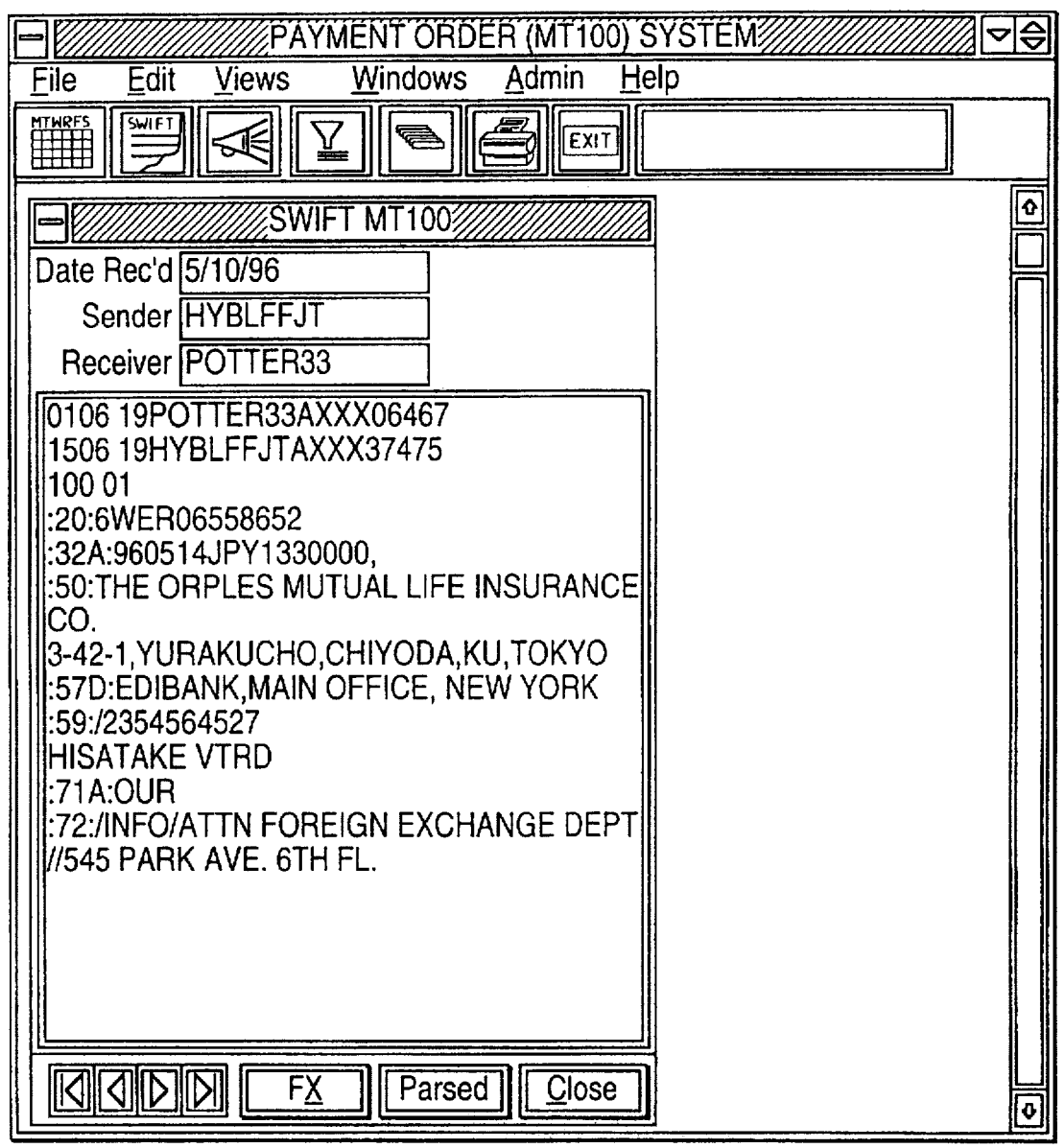
FIG. 28 represents an original, unparsed message to the Payment Order Server.
Figure 29:
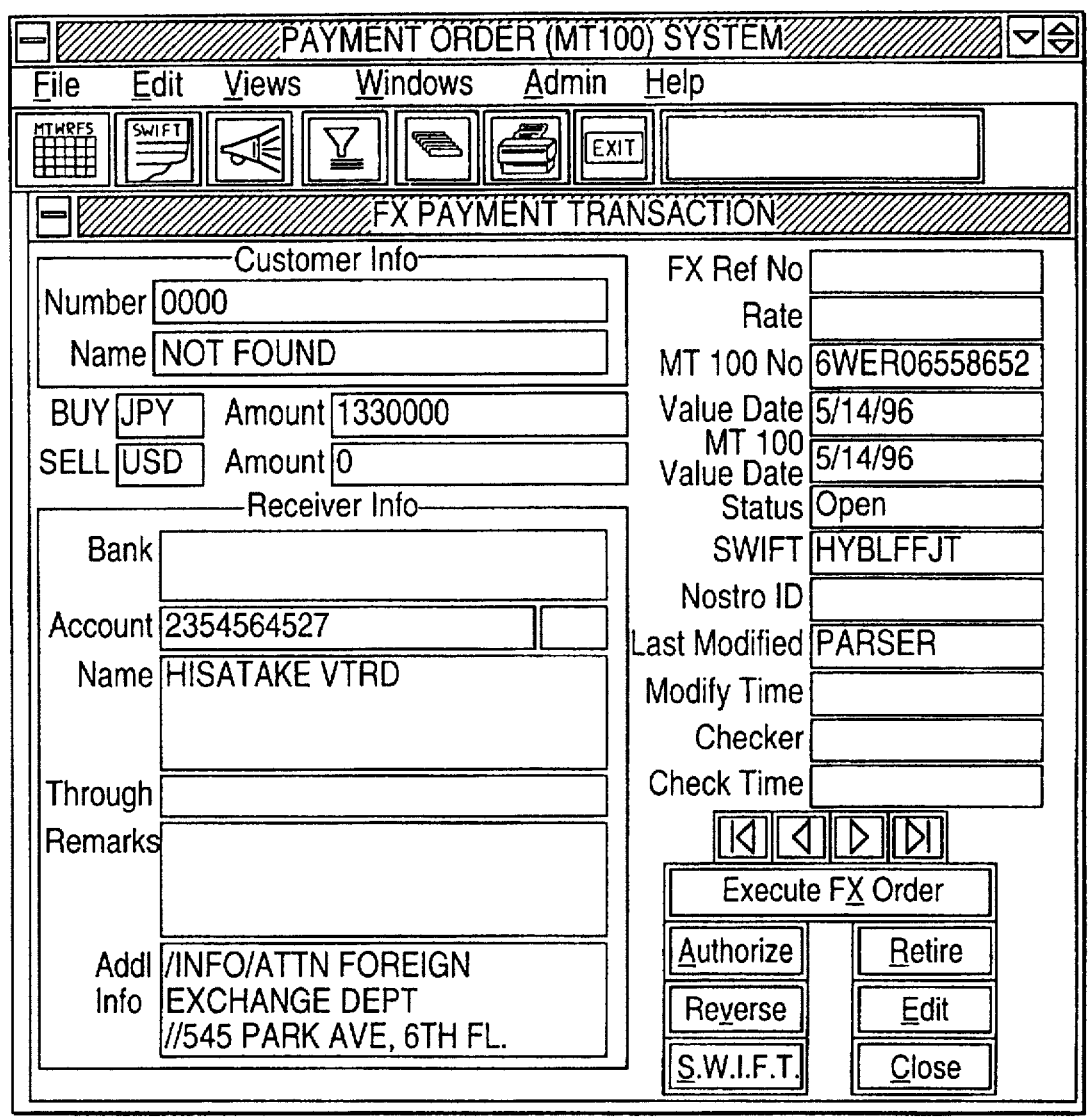
FIG. 29 represents an FX Payment transaction screen.

The Payment Order Server receives incoming payment messages by the SWIFT Agent Server 122 or the Batch File Server 116 via direct internal financial institution user log-in to the Payment Order Server (refer to FIG. 29). FIG. 13 illustrates the different components and methods of messages being received by the Payment Order Server, processed, and submitted to the FX Trade Server, as is described below. The SWIFT Agent Server receives messages predicated on worldwide SWIFT standards and protocols, as commonly known in the FX and banking industry. Customers may send SWIFT messages directly to the SWIFT Agent Server. FIG. 28 represents a message to the Payment Order Server in the original SWIFT format. FIG. 27 represents an original SWIFT message broken down into its constituents, or parsed, for easier reading. The Payment Order Server acknowledges receiving the SWIFT messages; in turn, the SWIFT Agent Server deletes the acknowledged files from its memory.

Banks can employ either the SWIFT network to transmit messages in SWIFT-sanctioned format (MT100) or a batch file transfer method to send payment messages from the individual financial institution. If from the latter, the Batch File Server determines which of the messages contained in the financial institution's mainframe are for foreign currency exchange by the Payment Order server, retrieves those messages and passes these messages to the Payment Order Server. The Payment Order Server acknowledges receiving the Batch Files; in turn, the Batch File Server deletes the acknowledged files from its memory.

Customers can log-in to the Payment Order Server, using the log-in process that FIGS. 3–4 depict. However, user profile validation is performed by the FX Trade Server at the time the Payment Order Server sends Payment messages to the FX Trade Server prior to trade execution (refer to FIG. 7).

Customers can review Payment Order inbound messages on a blotter (see FIG. 26). The blotter's information includes—the Date (of payment message submittal), the Sender identification, the payment Receiver, payment Status, Buy currency (the foreign currency), Sell currency (USD), the transaction amount, and the Payment Order transaction number.

What is claimed is:

1. A method for a user to perform financial transactions involving a plurality of currencies comprising the steps of:
accessing a financial system affiliated with a financial institution using a terminal, wherein said terminal is a personal computer acting as a local client in a client-server architecture, and running in a graphical user interface environment;
verifying that said access to said system is authorized;
identifying an account affiliated with said user to trade on;
inputting a first currency and a second currency to be used in said transaction;
inputting the desired characteristics of said transaction including a desired transaction amount;
determining automatically the terms to be offered by said financial institution to said user for said transaction including a rate of exchange between said two currencies;
informing said user of said offered transaction terms;
accepting said offered transaction terms;
reverifying user authorization prior to a release; and
releasing automatically said accepted transaction terms for execution.

2. The method of claim 1 wherein said verifying step further includes the step of said user inputting said user's name and password.

3. The method of claim 1 further including the step of selecting the desired financial transaction from a menu.

4. The method of claim 1 wherein said step of inputting an account to trade on further comprises a step of selecting accounts from a menu list.

5. The method of claim 1 further including the step of storing a record of the terms of the transaction offered and the time of said offer.

6. The method of claim 1 further including the step of assigning a reference number to said offer and storing said reference number.

7. The method of claim 1 further including the step of reconfirming said accepted transaction with said user prior to said releasing step.

8. The method of claim 1 further including the step of summarizing said released transaction and providing said summarization to said user.

9. The method of claim 1 further including the step of automatically comparing said accepted offer against a credit limit for said user and automatically permitting release of said accepted transaction if said accepted offer is less than said credit limit.

10. The method of claim 1 further including the step of automatically recording the time of said released transaction.

11. The method of claim 1 further including the step of automatically sending said released transaction to a deal capture system.

12. The method of claim 1 further including the step of automatically sending a record of said released accepted transaction to a database affiliated with said financial institution.

13. The method of claim 1 wherein said reverifying step includes said user reentering said user's identification and password.

14. The method of claim 1 wherein said financial institution is a bank.

15. The method of claim 1 wherein said first currency is U.S. Dollars.

16. The method of claim 1 wherein said second currency is U.S. Dollars.

17. The method of claim 1 wherein said first currency is sold and said second currency is bought.

18. The method of claim 1 wherein said first currency is bought and said second currency is sold.

19. The method of claim 1 wherein said transaction is settled at an immediate date.

20. The method of claim 1 wherein said transaction is settled at a future date and further including the step of:

inputting the desired date for said transaction to settle.

21. The method of claim 1 wherein said desired characteristics include the option of a two-way price quote for said first and second currencies and further wherein said accepting step further includes the step of said user identifying which currency to buy and which currency to sell before continuing with the transaction.

22. The method of claim 1 further including a step of reporting details of said released transaction to said user including a transaction reference number, a status report, and the transaction date and time.

23. The method of claim 1 further including the step of displaying at least one report of all transactions to said user.

24. The method of claim 1 wherein said inputting first and second currencies step further includes the step of displaying all second currencies available for trade with said first currency once said first currency is input.

25. The method of claim 24 further including the step of selecting said displayed second currency.

26. The method of claim 1 wherein said determining step further includes the step of a spread automatically being added to a base quote for said transaction.

27. The method of claim 26 wherein said spread is automatically calculated by factors including the cash value of said transaction.

28. The method of claim 1 wherein said desired characteristics include a swap trade and said inputting of desired characteristics step further includes the step of inputting a plurality of swap legs, the forward currency and a forward currency amount for each leg.

29. The method of claim 28 wherein said step of inputting of desired characteristics is done on a spreadsheet.

30. The method of claim 28 wherein the number of legs is between two and six.

31. The method of claim 1 wherein said accessing step is done via a public network.

32. The method of claim 31 wherein said terminal is a personal computer (PC) running in a Windows environment.

33. The method of claim 31 further including the step of sending information specific about the user to said terminal.

34. The method of claim 1 further including the step of sending a signal to the user if the system becomes inoperative.

35. The method of claim 34 wherein said signal includes an audio signal.

36. The method of claim 34 wherein said signal includes a visual signal.

37. The method of claim 34 wherein said signal includes both an audio signal and a visual signal.

38. The method of claim 1 wherein said desired characteristics include order entry of a leave order and said step of inputting said desired characteristics of said transaction include a target foreign exchange rate between said two currencies;

and further including a step of monitoring automatically a financial market associated with said financial transaction and confirming that said accepted terms are available in said financial market.

39. The method of claim 38 further including the step of reporting automatically to said user of the differences between said market terms and said accepted offer.

40. The method of claim 39 wherein said reporting is color-coded to reflect the magnitude of said difference.

41. The method of claim 1 wherein said step of offering said transaction to said customer further includes the step of limiting said offer to a specific time period.

42. The method of claim 41 wherein said time period is 5–15 seconds.

43. The method of claim 41 wherein said offering step further includes the step of providing the user the option to refresh said offer.

44. The method of claim 43 wherein said option is available during said specific time period.

45. The method of claim 43 further including the steps of updating said offered terms of said transaction and restarting said specific time period when said option is chosen by said user.

46. The method of claim 1 wherein said desired characteristics include a leave order and said step of inputting the desired characteristics of said transaction further includes inputting an expiration period;

and further including a step of monitoring automatically prior to expiration a financial market affiliated with said transaction and confirming that the accepted terms are available in said market.

47. The method of claim 46 wherein said expiration period is for a fixed period of time.

48. The method of claim 46 further including the step of automatically executing said leave order when said accepted terms become available in said market.

49. The method of claim 46 further including the step of entering said desired characteristics in a blotter.

50. The method of claim 49 wherein said step of entering said desired characteristics in the blotter is coupled to said step of inputting the desired characteristics of said transaction.

51. The method of claim 46 wherein said expiration period is indefinite and expires when subsequently canceled by said user.

52. The method of claim 51 further including the step of warning a said user when said expiration period has extended over a certain period of time without expiring.

53. The method of claim 52 wherein said certain period of time is two months.

54. The method of claim 52 further including the step of said user setting said certain period of time for receiving said warning.

55. A method for a user to perform financial transactions involving a plurality of currencies comprising the steps of:

accessing a financial system affiliated with a financial institution using a terminal, wherein said terminal is a personal computer acting as a local client in a client-server architecture, and running in a graphical user interface environment;

verifying that said access to said system is authorized;

identifying an account affiliated with said user to trade on;

inputting a first currency and a second currency to be used in said transaction;

inputting the desired characteristics of said transaction including a desired transaction amount, a leave order and an indefinite expiration period which expires when subsequently cancelled by said user;

determining automatically the terms to be offered by said financial institution to said user for said transaction including a rate of exchange between said two currencies;

informing said user of said offered transaction terms;

accepting said offered transaction terms;

said user setting a certain period of time for receiving a warning;

releasing automatically said accepted transaction terms for execution; and warning said user when said indefinite expiration period has extended over said certain period of time without expiring.

56. A method for a user to perform financial transactions involving a plurality of currencies comprising the steps of:

accessing a financial system affiliated with a financial institution using a terminal, wherein said terminal is a personal computer acting as a local client in a client-server architecture, and running in a graphical user interface environment;

verifying that said access to said system is authorized;

identifying an account affiliated with said user to trade on;

inputting a first currency and a second currency to be used in said transaction;

inputting the desired characteristics of said transaction including a desired transaction amount, a leave order and an indefinite expiration period which expires when subsequently cancelled by said user;

determining automatically the terms to be offered by said financial institution to said user for said transaction including a rate of exchange between said two currencies;

informing said user of said offered transaction terms;

accepting said offered transaction terms;

releasing automatically said accepted transaction terms for execution; and warning said user when said indefinite expiration period has extended over two months without expiring.

57. A method for a user to perform a financial transaction including a money market transaction involving at least two currencies comprising the steps of:

accessing a financial system affiliated with a financial institution;

verifying that said access to said system is authorized;

identifying an account affiliated with said user to trade in;

inputting a currency to be deposited in said money market transaction;

inputting the desired characteristics of said transaction including a maturity date of said deposit, and a foreign currency principal amount;

determining automatically the terms to be offered by said financial institution to said user for said money market transaction including an interest rate and an interest amount in a first currency and equivalent amount in a second currency;

informing said user of said offered transaction terms;

accepting said offered transaction terms;

reverifying user authorization prior to release; and releasing automatically said accepted transaction terms for execution.

58. The method of claim 57 wherein said second currency is a currency other than U.S. Dollars.

59. A method for a user to perform non-interbank financial transactions involving a plurality of currencies comprising the steps of:

accessing a financial system affiliated with a financial institution to perform a non-interbank transaction using a terminal, wherein said terminal is a personal computer acting as a local client in a client-server architecture having at least three tiers, and running in a graphical user interface environment;

verifying that said access to said system is authorized;

identifying an account affiliated with said user to trade on;

inputting a first currency and a second currency to be used in said non-interbank transaction;

inputting the desired characteristics of said transaction including a desired transaction amount, a leave order and an indefinite expiration period which expires when subsequently cancelled by said user;

determining automatically the terms to be offered by said financial institution to said user for said transaction through the use of message routing including a standing price comprising a rate of exchange between said two currencies;

informing said user of said offered transaction terms;

accepting said offered transaction terms; and releasing automatically said accepted transaction terms for execution.

60. The method of claim 59 further comprising the step of providing information regarding said terms to said user in an interactive spreadsheet.

61. A method for a user to perform a non-interbank financial transaction including a money market transaction involving at least two currencies comprising the steps of:

accessing a financial system affiliated with a financial institution to perform a non-interbank transaction using a terminal, wherein said terminal is a personal computer acting as a local client in a client-server architecture having at least three tiers, and running in a graphical user interface environment;

verifying that said access to said system is authorized;

identifying an account affiliated with said user to trade in;

inputting a currency to be deposited in said non-interbank money market transaction;

inputting the desired characteristics of said transaction including a maturity date of said deposit, and a foreign currency principal amount;

determining automatically the terms to be offered by said financial institution to said user for said money market transaction through the use of message routing including a standing price comprising an interest rate and an interest amount in a first currency and equivalent amount in a second currency;

informing said user of said offered transaction terms;

accepting said offered transaction terms; and releasing automatically said accepted transaction terms for execution.

62. The method of claim 61 further comprising the step of providing information regarding said terms to said user in an interactive spreadsheet.

63. A method for a user to perform a non-interbank payment order financial transaction, wherein payments are made in a first currency after being exchanged from one of a plurality of second currencies comprising the steps of:

accessing a financial system affiliated with a financial institution to perform a non-interbank transaction using a terminal, wherein said terminal is a personal computer acting as a local client in a client-server architecture having at least three tiers, and running in a graphical user interface environment;

verifying that said access to said system is authorized;

identifying an account affiliated with said user to trade on;

inputting said second currency to be used in said non-interbank transaction;

inputting the desired characteristics of said transaction including a desired transaction amount;

determining automatically the terms to be offered by said financial institution to said user for said transaction through the use of message routing including a standing price comprising a rate of exchange between said two currencies;

informing said user of said offered transaction terms;

accepting said offered transaction terms; and releasing automatically said accepted transaction terms for execution.

64. The method of claim 63 further including the step of providing information regarding said terms to said user in an interactive spreadsheet.

65. A method for a user to perform a payment order financial transaction, wherein payments are made in a first currency after being exchanged from one of a plurality of second currencies comprising the steps of:

accessing a financial system affiliated with a financial institution;

verifying that said access to said system is authorized;

identifying an account affiliated with said user to trade on;

inputting said second currency to be used in said transaction;

inputting the desired characteristics of said transaction including a desired transaction amount;

determining automatically the terms to be offered by said financial institution to said user for said transaction including a rate of exchange between said two currencies;

informing said user of said offered transaction terms;

accepting said offered transaction terms;

reverifying user authorization prior to release; and releasing automatically said accepted transaction terms for execution.

66. The method of claim 65 further including the step of performing a user profile validation prior to said releasing step.

67. The method of claim 65 wherein said first currency is U.S. Dollars.

68. The method of claim 65 further including the step of storing said input of said second currency and said input of said desired characteristics as parts of a payment summary screen.

69. The method of claim 68 wherein said payment summary screen further includes the date of said input, sender identification information, receiver identification information, status of the payment information, said second currency, said first currency, said transaction amount and a payment order transaction number.

70. The method of claim 69 further including the step of displaying said payment summary screen.

71. A method for a user to perform non-interbank financial transactions involving a plurality of currencies comprising the steps of:

accessing a financial system affiliated with a financial institution to perform a non-interbank transaction using a terminal, wherein said terminal is a personal computer acting as a local client in a client-server architecture having at least three tiers, and running in a graphical user interface environment;

verifying that said access to said system is authorized;

identifying an account affiliated with said user to trade on;

inputting a first currency and a second currency to be used in said non-interbank transaction;

inputting the desired characteristics of said transaction including a desired transaction amount;

determining automatically the terms to be offered by said financial institution to said user for said transaction through the use of message routing including a standing price comprising a rate of exchange between said two currencies;

informing said user of said offered transaction terms;

accepting said offered transaction terms; and releasing automatically said accepted transaction terms for execution.

72. The method of claim 71 wherein said accessing step is done via a public network.

73. The method of claim 71 wherein said verifying step further includes the step of said user inputting said user's name and password.

74. The method of claim 71 further including the step of selecting the desired financial transaction from a menu.

75. The method of claim 71 wherein said step of inputting an account to trade on further comprises a step of selecting accounts from a menu list.

76. The method of claim 71 further including the step of storing a record of the terms of the transaction offered and the time of said offer.

77. The method of claim 71 further including the step of assigning a reference number to said offer and storing said reference number.

78. The method of claim 71 further including the step of reconfirming said accepted transaction with said user prior to said releasing step.

79. The method of claim 71 further including the step of summarizing said released transaction and providing said summarization to said user.

80. The method of claim 71 further including the step of automatically comparing said accepted offer against a credit limit for said user and automatically permitting release of said accepted transaction if said accepted offer is less than said credit limit.

81. The method of claim 71 further including the step of automatically recording the time of said released transaction.

82. The method of claim 71 further including the step of automatically sending said released transaction to a deal capture system.

83. The method of claim 71 further including the step of automatically sending a record of said released accepted transaction to a database affiliated with said financial institution.

84. The method of claim 71 wherein said financial institution is a bank.

85. The method of claim 71 wherein said first currency is U.S. Dollars.

86. The method of claim 71 wherein said second currency is U.S. Dollars.

87. The method of claim 71 wherein said first currency is sold and said second currency is bought.

88. The method of claim 71 wherein said first currency is bought and said second currency is sold.

89. The method of claim 71 wherein said transaction is settled at an immediate date.

90. The method of claim 71 wherein said transaction is settled at a future date and further including the step of:

inputting the desired date for said transaction to settle.

91. The method of claim 71 wherein said desired characteristics include the option of a two-way price quote for said first and second currencies and further wherein said accepting step further includes the step of said user identifying which currency to buy and which currency to sell before continuing with the transaction.

92. The method of claim 71 further including a step of reporting details of said released transaction to said user including a transaction reference number, a status report, and the transaction date and time.

93. The method of claim 71 further including the step of displaying at least one report of all transactions to said user.

94. The method of claim 71 further including the step of providing information regarding said terms to said user in an interactive spreadsheet.

95. The method of claim 94 further including the step of sending information specific about the user to said terminal.

96. The method of claim 71 wherein said inputting first and second currencies step further includes the step of displaying all second currencies available for trade with said first currency once said first currency is input.

97. The method of claim 96 further including the step of selecting said displayed second currency.

98. The method of claim 71 wherein said determining step further includes the step of a spread automatically being added to a base quote for said transaction.

99. The method of claim 98 wherein said spread is automatically calculated by factors including the cash value of said transaction.

100. The method of claim 71 wherein said desired characteristics include both even and uneven swap trades and said inputting of desired characteristics step further includes the step of inputting a plurality of swap legs, the forward currency and a forward currency amount for each leg.

101. The method of claim 100 wherein said step of inputting of desired characteristics is done in a spreadsheet either on-line or off-line with said spreadsheet automatically imported to a trade input screen on said terminal.

102. The method of claim 100 wherein the number of legs is between two and six.

103. The method of claim 71 further including the step of sending a signal to the user if the system becomes inoperative.

104. The method of claim 103 wherein said signal includes an audio signal.

105. The method of claim 103 wherein said signal includes a visual signal.

106. The method of claim 103 wherein said signal includes both an audio signal and a visual signal.

107. The method of claim 71 wherein said desired characteristics include order entry of a leave order and said step of inputting said desired characteristics of said transaction include a target foreign exchange rate between said two currencies;

and further including a step of monitoring automatically a financial market associated with said financial transaction and confirming that said accepted terms are available in said financial market.

108. The method of claim 107 further including the step of reporting automatically to said user of the differences between said market terms and said accepted offer.

109. The method of claim 108 wherein said reporting is color-coded to reflect the magnitude of said difference.

110. The method of claim 71 wherein said step of offering said transaction to said customer further includes the step of limiting said offer to a specific time period.

111. The method of claim 110 wherein said time period is 5-15 seconds.

112. The method of claim 110 wherein said offering step further includes the step of providing the user the option to refresh said offer.

113. The method of claim 112 wherein said option is available during said specific time period.

114. The method of claim 112 further including the steps of updating said offered terms of said transaction and restarting said specific time period when said option is chosen by said user.

115. The method of claim 71 wherein said desired characteristics include a leave order and said step of inputting the desired characteristics of said transaction further includes inputting an expiration period;

and further including a step of monitoring automatically prior to expiration a financial market affiliated with said transaction and confirming that the accepted terms are available in said market.

116. The method of claim 115 wherein said expiration period is for a fixed period of time.

117. The method of claim 115 further including the step of automatically executing said leave order when said accepted terms become available in said market.

118. The method of claim 115 further including the step of entering said desired characteristics in a blotter.

119. The method of claim 118 wherein said step of entering said desired characteristics in the blotter is coupled to said step of inputting the desired characteristics of said transaction.

120. The method of claim 115 wherein said expiration period is indefinite and expires when subsequently canceled by said user.

121. The method of claim 120 further including the step of warning a said user when said expiration period has extended over a certain period of time without expiring.

122. The method of claim 121 wherein said certain period of time is two months.

123. The method of claim 121 further including the step of said user setting said certain period of time for receiving said warning.

* * * * *